United States Patent [19]

Martin

[11] Patent Number: 6,105,016
[45] Date of Patent: Aug. 15, 2000

[54] DATA ACQUISITION SYSTEM

[75] Inventor: Thomas J. Martin, State College, Pa.

[73] Assignee: Jodfrey Associates, Inc., Laurel, Md.

[21] Appl. No.: 09/063,669

[22] Filed: Apr. 21, 1998

Related U.S. Application Data

[60] Provisional application No. 60/077,122, Mar. 6, 1998.

[51] Int. Cl.[7] .................................................. G06F 17/30
[52] U.S. Cl. .............................. 707/1; 707/10; 707/101
[58] Field of Search .................................. 707/1, 10, 101

[56] References Cited

U.S. PATENT DOCUMENTS

| | | | |
|---|---|---|---|
| 3,801,958 | 4/1974 | Simmons et al. | 340/147 |
| 4,490,788 | 12/1984 | Rasmussen | 364/200 |
| 5,349,644 | 9/1994 | Massey et al. | 707/10 |
| 5,808,558 | 9/1998 | Meek et al. | 340/870.01 |
| 5,867,688 | 2/1999 | Simmon et al. | 707/500 |

OTHER PUBLICATIONS

Payne et al, High Speed PC–Based Data Acquisition Systems, Conference Record of the 1995 IEEE. vol. 3, pp. 2140–2145, Oct. 1995.

Aloisio et al, Custom Busses for Large Scale Data Acquisition Systems, ICESC, pp. 1155–1161, 1996.

Pito et al, Data Acquisition and Representation of Mechanical Parts and Interfaces to Manufacturing devices, Internation Conference on recent Advances, pp. 2–9, May 1997.

Martin, PC–based Data Acquisition in an Industrial Environment, PC–Based data Acquisition in an Industrial Environment, pp. 2/1–2/3 1990.

Border, Data Acquisition and Control Software Packages, IEEE Conference Record of 1990 Forty Second Annual Conference, pp. 29–31, May 1990.

Viskoe, Optimal Computed Tomography Data Acquisition Techniques and Filter Selection for Detection of Small Density Variations, IEEE Transactions on Instrumentation and Measurement, vol. 45, No. 1, pp. 70–76, Feb. 1996.

Berg–Cross, A Case Based–Design to Augment Corporate Mergers and Acquisition Decisions, Artificial Intelligence on Wall Street, 1991. Proceedings., First International Conference, pp. 188–193, Oct. 1991.

Heinicke, VMSMULTI/DA: A Single Process CAMAC Data Acquisition System for VMS, IEEE Transactions on Nuclear Science, vol. 36, No. 1, pp. 705–708, Feb. 1989.

*Primary Examiner*—Paul R. Lintz
*Assistant Examiner*—Frantz Coby
*Attorney, Agent, or Firm*—Frishauf, Holtz, Goodman, Langer & Chick, P.C.

[57] ABSTRACT

A data acquisition system for use with a computer includes an interface unit for interfacing with a computer; a control data memory for storing control data which is associated with controls for the computer; and a file data memory for storing file data which is to be acquired by the computer. A processing system is provided for controlling operation of the control data memory and file data memory, and for controlling transfer of data to the computer from the file data memory via the interface unit via a controllable data bus and an address/control bus.

14 Claims, 21 Drawing Sheets

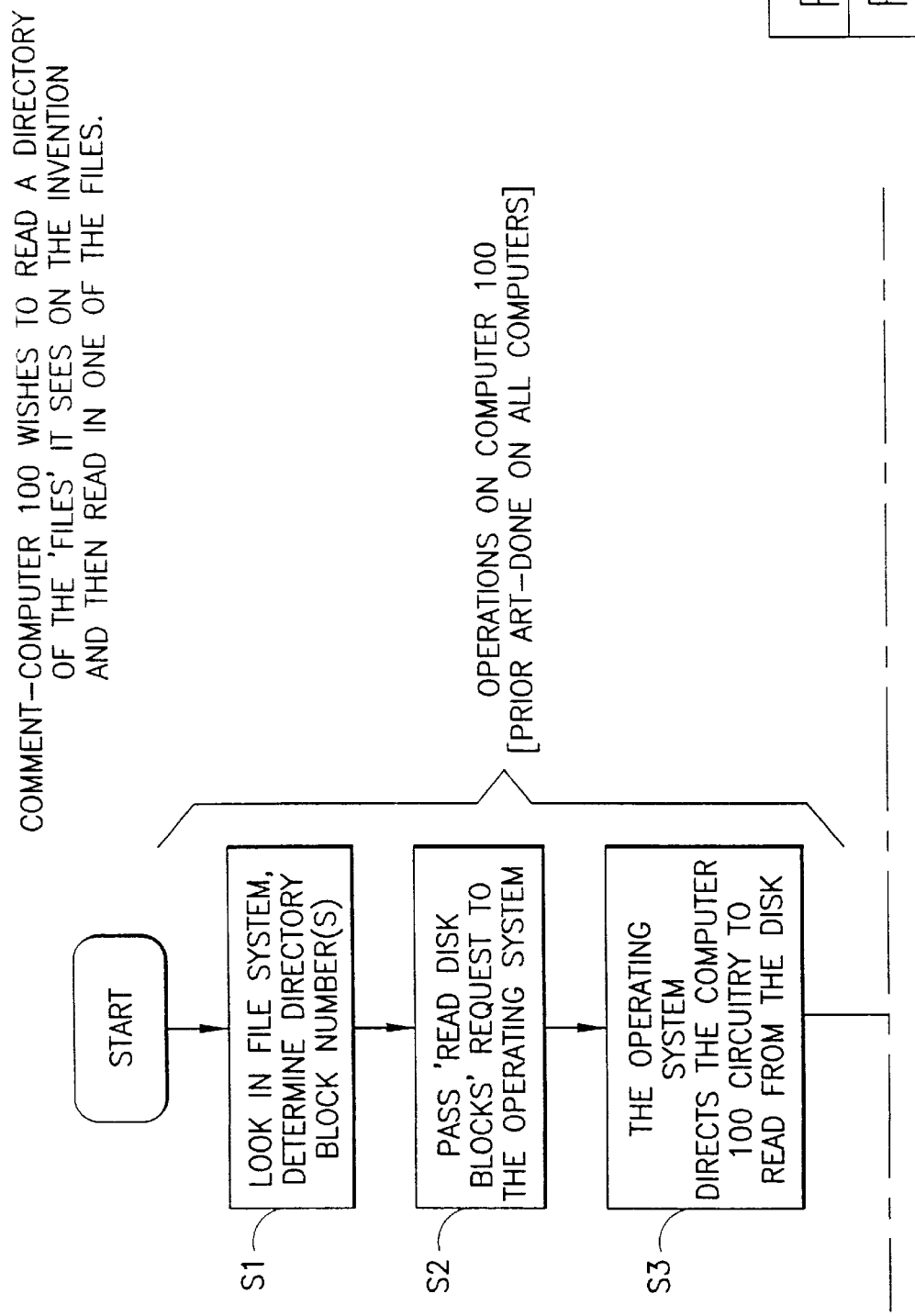

COMMENT—COMPUTER 100 WISHES TO READ A DIRECTORY OF THE 'FILES' IT SEES ON THE INVENTION AND THEN WRITE TO ONE OF THE FILES.

OPERATIONS ON COMPUTER 100 [PRIOR ART—DONE BY ALL COMPUTERS]

START → S11 LOOK IN FILE SYSTEM, DETERMINE DIRECTORY BLOCK NUMBER(S) → S12 PASS 'WRITE DISK BLOCKS' REQUEST TO THE OPERATING SYSTEM → S13 THE OPERATING SYSTEM DIRECTS THE COMPUTER 100 CIRCUITRY TO WRITE TO THE DISK

FIG.12A

| FIG.12A |
| FIG.12B |

| Pin | # | | Pin | # |
|---|---|---|---|---|
| D14 | 85 | | SD0 | 170 |
| D13 | 86 | | SD1 | 169 |
| D12 | 88 | | SD2 | 167 |
| D11 | 89 | | SD3 | 166 |
| D10 | 90 | | SD4 | 165 |
| D9 | 91 | | SD5 | 164 |
| D8 | 94 | | SD6 | 162 |
| D7 | 95 | | SD7 | 161 |
| D6 | 96 | | SD8 | 144 |
| D5 | 98 | | SD9 | 142 |
| D4 | 99 | | SD10 | 141 |
| D3 | 101 | | SD11 | 140 |
| D2 | 102 | | SD12 | 176 |
| D1 | 107 | | SD13 | 175 |
| D0 | | | SD14 | 174 |
| FC1 | 37 | | SD15 | 172 |
| FC0 | 38 | | SDP0 | 160 |
| TSTOUT | 78 | | SDP1 | 171 |
| TSTIN | 182 | | C/D | 147 |
| TIP | 57 | | I/O | 145 |
| DLE | 109 | | MSG | 150 |
| BOFF | 118 | | REQ | 146 |
| FC2 | 36 | | ACK | 152 |
| DP2 | 81 | | BSY | 153 |
| DP1 | 92 | | SEL | 149 |
| DP0 | 108 | | ATN | 159 |
|  |  | | RST | 151 |
|  |  | | SDIR0 | 188 |
|  |  | | SDIR1 | 187 |
|  |  | | SDIR2 | 185 |
|  |  | | SDIR3 | 184 |
|  |  | | SDIR4 | 183 |
|  |  | | SDIR5 | 180 |
|  |  | | SDIR6 | 179 |
|  |  | | SDIR7 | 178 |
|  |  | | SDIR8 | 139 |
|  |  | | SDIR9 | 138 |
|  |  | | SDIR10 | 137 |
|  |  | | SDIR11 | 136 |
|  |  | | SDIR12 | 194 |
|  |  | | SDIR13 | 193 |

U1
53C770

| Pin | # |
|---|---|
| GPO | 26 |
| MAC | 127 |
| AUTO | 114 |
| BS2 | 113 |
| BS1 | 112 |
| BS0 | 111 |
| SC1 | 110 |
| SC0 | 46 |
| TT1 | 47 |
| TT0 | 2 |
| CS_RAM | 128 |
| DIFFSENS | 129 |
| TGS | 131 |
| IGS | 134 |
| BSYDIR | 132 |
| SELDIR | 133 |
| RSTDIR |  |
| SDIRP1 | 189 |
| SDIRP0 | 177 |
| SDIR15 | 191 |
| SDIR14 | 192 |

FIG. 16B

DATA ACQUISITION SYSTEM

CROSS-REFERENCE TO RELATED APPLICATIONS

This application claims the benefit of U.S. Provisional Application No. 60/077,122 filed Mar. 6, 1998.

BACKGROUND OF THE INVENTION

The present invention relates to a system that allows data acquisition and data processing circuitry to be accessed and controlled in the same manner as computer hard drives without the use of any special software on the host computer.

In order to help explain the present invention, which is a new method of performing data acquisition and processing, an overview of a computer Operating System (OS) is provided, followed by a detailed explanation of the interface differences between an application program and an operating system. It should be understood that there is a distinct interface layer between these two, which interface layer is used by the present invention.

Every Personal Computer, or "PC" as they are called, runs a piece of software called an Operating System (OS), which directs and controls basic computer operation. Common examples of PC operating systems are DOS, Windows, Windows 95, Unix, Windows NT, and the Macintosh System/7. Although each of these OSs provides a different user interface and "looks different" from the others to a user, they all perform basic housekeeping jobs within the computer. Things like opening and closing files, running programs, displaying text and graphics, and keeping track of the date and time, are all tasks performed by an operating system.

Application programs make use of the operating system by assuming that the operating system will take care of the many trivial and not-so-trivial details of common operations such as opening a disk file, and thus the application program does not have to manage these operations. One way to visualize this operating system—versus application interface is by thinking of the computer as an onion. Onions consist of a number of layers, much like the software in the computer. The inner core of the onion represents the hardware of the system—the RAM, the CPU, the keyboard and all the other circuitry in the system. Layers toward the outside of the onion represent the operating system and the dry skin of the onion represents an application program such as a spreadsheet or a word processing program.

The application programs should not access the hardware of the system without going through the operating system (you cannot get to the core of the onion except by going through the middle layers). There are many exceptions to this rule, for example, cases where programmers have found tricks to bypass the operating system (OS) for reasons of ease of programming, extra speed, just to be tricky, or to go around security features of the OS.

The present invention takes advantage of the fact that application programs do not get involved with system-level operations involving opening, closing, reading and writing disk files. All of the low-level details are left to the operating system. FIG. 1 shows a typical software "dialogue" that takes place between a program such as a word processing program and the OS. Assume a user wishes to open a file called NOTE1.DOC, enter some test into it (e.g., type a few notes about a business meeting), then close the file, and then print it.

All of the steps indicated with a rectangle are simple commands, such as "Open a file . . . ". The steps in a rounded rectangle generally consist of complicated control of hardware such as controlling a hard drive, controller a printer or reading data from a keyboard. The OS handles all of the details.

Now a typical prior art data acquisition system will be discussed.

A data acquisition system (or DA for short) is a combination of computer hardware and software that gathers, stores or processes data in order to control or monitor some sort of physical process. For example, a system that monitors the amount of raisins put into each box of Raisin Bran is a data acquisition (DA) system. So is a system that gathers and records weather data every minute or hour for use in forecasting tomorrow's weather. And so is a system that records stock market prices every minute for updating on a stock-market ticker. Data acquisition is a very common and necessary tool in today's technology.

Data Acquisition (DA) was implemented years ago on dedicated hardware that cost thousands of dollars, with little or no DA capability taking place on PCs and less-expensive systems. In the past few years, however, hardware boards and software packages that implement very powerful DA capability have been introduced by many vendors, paving the way for less expensive and more pervasive systems being put to use in solving real-world problems.

With no exception that the present invention has found, every DA system available on the market for PCs and similar workstations has its own software package for allowing a vendor's hardware (plug-in boards, cables, sensors, etc.) to be controlled by the PC or workstation. The advantage of each vendor providing their own software is that the vendor then has control over how the hardware is accessed, controlled and used, thus ensuring (to the degree possible) correct operation of the entire DA system. The vendor software is also a good insulation layer (another layer of our onion, near the outer skin) to other DA programs, such as plotting, graphing and data recorder programs, by presenting a standardized interface between the hardware and the other DA applications. The DA-hardware/DA-software interface is similar to the OS/application interface layer discussed earlier.

The disadvantages of each vendor providing their own DA interface software are many. One disadvantage is interoperability. If a user likes the plotting utility provided by vendor X's DA package, but needs the performance characteristics of vendor Y's plug-in board, it is almost guaranteed that the two pieces will not play well together. Interoperability also applies between different types of computers. If a user's current vendor X DA system runs on an inexpensive PC and the user needs to transition it to a big, powerful workstation running a different OS to deliver to the military, for example, there is currently no way to do this. The workstation with the different OS is (99 times out of 100) typically not supported by the vendor X hardware and software. In today's torrid environment of new, faster computers coming out almost monthly, interoperability of DA hardware and software between different systems would be highly desirable.

Two other disadvantages of each vendor providing their own DA interface software are cost and learning curves. Typically, each vendor provides a software package that is either proprietary at worst or a pseudo industry-standard at best. One has to go to this vendor for other software such as analysis packages, signal processing packages that work with the DA hardware and interface software, etc. This 'locks' one into one vendor and one may have to accept a less-than-preferred software package as a result, just due to its software interface. With each new vendor's DA interface software, the user must then learn how to use the package, work through any bugs, and get proficient with it to the point where the DA work becomes efficient and productive. The learning curve costs are considerable.

One area of commonality on almost all computers that perform data acquisition (DA), whether they be PCs or big, expensive workstations, is hard disk storage. Hard drives are a fundamental part of almost all computers, and users are generally comfortable with using them and opening and closing files, copying and deleting files, organizing their disk, etc. Referring back to the operating system discussion and the onion, the hard drive's hardware resides in the middle of the onion, surrounded by the OS. The OS manages the details of all of the hard drive's operation so that application software does not need to manage it.

The object of the present invention revolves around a data acquisition/data processing system that exactly mimics a hard drive. It takes advantage of the fact that application software is insulated from low-level hardware by the operating system to achieve not only application-software independence but also system portability and interoperability.

A further object of the present invention is to provided a data acquisition/data processing system that can be used with almost any brand and type of computer system, just as disk drives can be added to almost any brand and type of computer system and configured for operation.

The present invention intends to encompass its basic concept not only in the data acquisition (DA) arena, but in the data processing arena (DP) as well.

SUMMARY OF THE INVENTION

According to the present invention, a data acquisition system for use with a computer, comprises an interface unit for interfacing with a computer; a memory unit for storing control data which is associated with controls for the computer; a memory for storing file data which is to be acquired by the computer; and a processing system for controlling operation of said control data memory and file data memory, and for controlling transfer of data to the computer via said interface by using a data bus and an address/control bus. In this manner, the data acquisition system of the present invention "looks like" a disk drive to the computer, and data acquisition and transfer are facilitated.

BRIEF DESCRIPTION OF THE DRAWINGS

FIG. 16 illustrates a preferred embodiment of a disk interface circuit device;

DETAILED DESCRIPTION

As part of normal operation, an OS (operating system) will transfer two types of data between itself and a hard drive—control data and actual file data. The file data can comprise executable programs, database files, spreadsheet files, word processing documents, or any other type of data, but the type of data stored in a file does not make any difference in the hard drive's operation. Control data includes commands and status information that are required for keeping track of where files are stored on the disk, what size they are, their time and date stamps, and other miscellaneous OS information related to the files. Security information, passwords and system configuration information are examples of other miscellaneous OS information.

In general, a data acquisition system according to the present invention operates as follows. A data acquisition (DA) or data processing (DP) unit, comprising typically (but not always), a small box with memory and circuitry inside, will have a hardware interface (cables, connectors, etc.) on it that conforms to all the industry standards for standard hard drives. Inside the box will be a microprocessor that controls all of the operations of the box, especially when it is connected to a PC or workstation and configured for operation as a hard drive. It looks to the system like a hard drive, even though it is a DA or DP box. When the PC or workstation passes control data back and forth between itself and the system of the present invention, that data will be passed in the exact manner as it would be for a normal hard drive. This preserves the system's view that the unit is indeed a hard drive by exactly passing control data like a hard drive.

When file data is passed between the PC or workstation and the system of the present invention, actual file data will not be passed, but instead, data acquired or used by the DA circuitry will be passed. Therefore, to pass sensor data from a temperature sensor, for example, from the system of the present invention to a PC, the PC's OS simply opens what it believes to be a file (on the system of the present invention) and reads in the file data. However, the data that the PC's OS reads is not from an actual "file" but is from a temperature sensor! The PC has been tricked!

The advantage of the technique of the present invention is that every computer that uses a hard drive can now have data acquisition capability without the need for any special software running on the computer. Any application software that deals with disk files (whether it runs on a PC, a workstation or a small embedded computer on an assembly line) can now have data acquisition and data processing capability.

Figure 1:
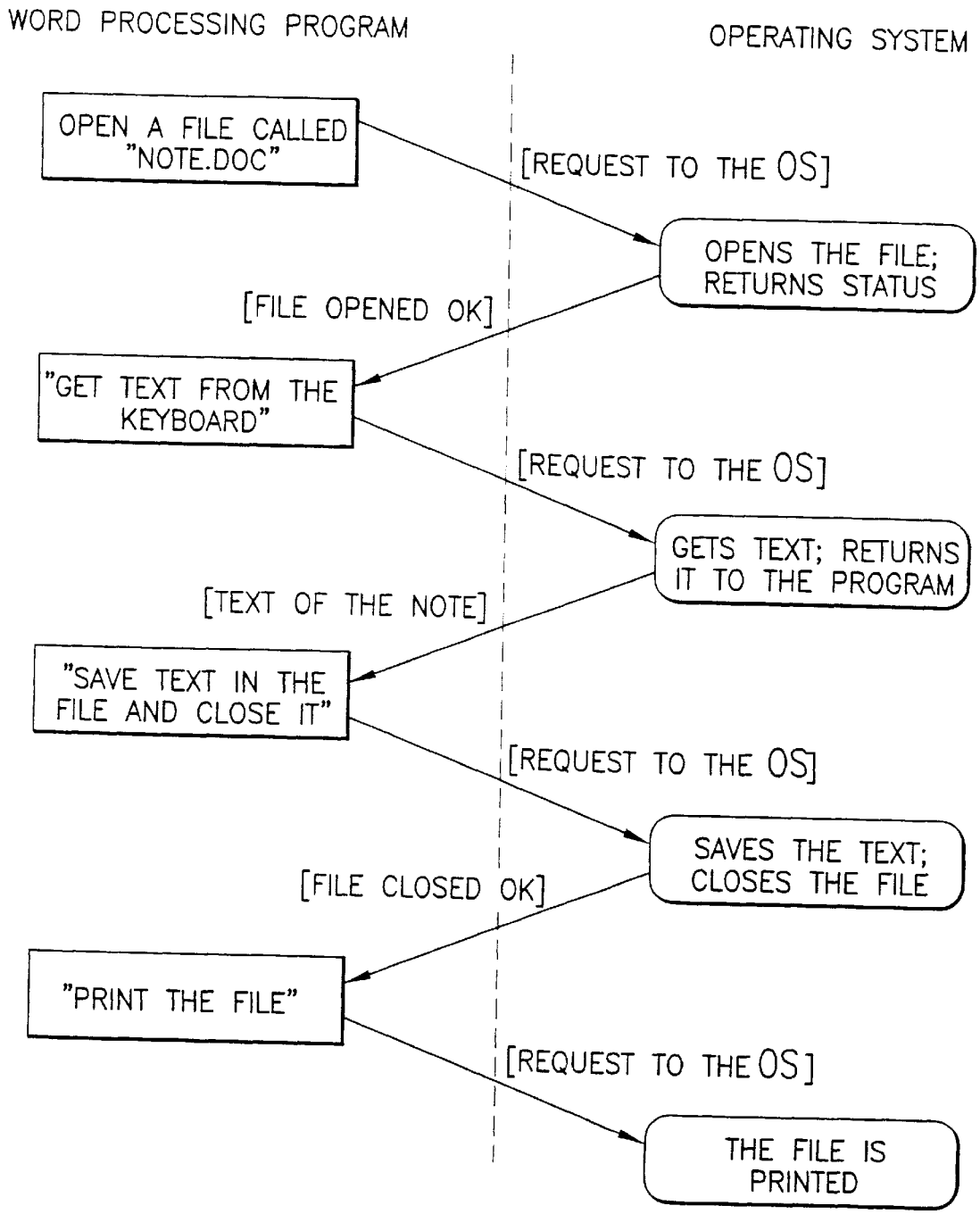
FIG. 1 shows a typical software "dialog" that takes place between a program such as a word-processing program and an operating system, in a conventional computer.
Figure 2:
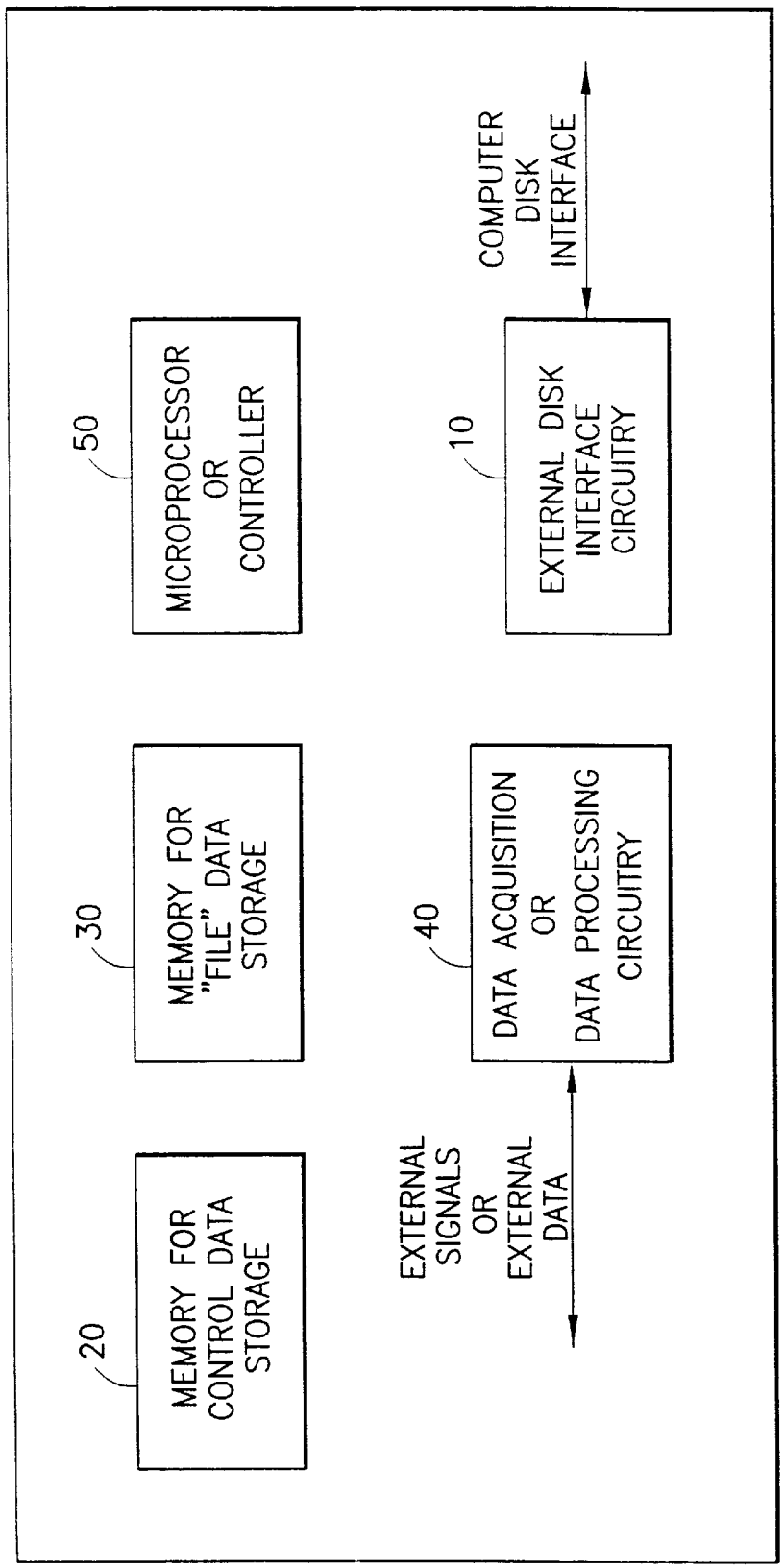
FIG. 2 is a block diagram showing an embodiment of apparatus according to the present invention.

FIG. 2 is a block diagram of a data acquisition system according to the present invention. All of the blocks shown in FIG. 2 are critical to the operation of this invention. FIGS. 3–7 show more detailed embodiments.

As shown in FIG. 2, a functional block titled "External Disk Interface Circuitry" 10 is part of the invention. This is the circuitry and electronic devices required to properly interface the invention to a computer system. Example interfaces which could be implemented, which are well known, but which the invention is not limited to, are SCSI (Small Computer System Interface), IDE (Integrated Device Electronics) and Fiber Channel. This circuitry and other electronic devices will follow a strict electrical, timing and data transfer protocol of such standard well known in interfaces, so that the invention appears to a connected computer to be a disk drive.

The block titled "Memory for Control Data Storage" 20 is the memory which is used to store any control data passed back and forth between the apparatus of the present invention and a connected computer to make the invention appear (from a software perspective at this point) like a standard disk drive. Some of this control data may be generated by a user running some sort of special setup or configuration procedure required to get the apparatus of the present invention ready for use.

The block titled "Memory for 'File' Data Storage" 30 is the memory which is used to store data passed back and forth between the invention apparatus of the present and a connected computer that is either generated by or received by the "Data Acquisition or Data Processing Circuitry" block 40. This memory 30 is read or written to during the sequence of read or write operations where the attached computer is accessing what it believes to be a disk file on the apparatus of the present invention, but is in reality blocks of memory from the data acquisition or data processing circuitry.

The "Data Acquisition or Data Processing Circuitry" block 40 is the electronic devices required to perform any number of data acquisition or data processing functions, but is not specified in the apparatus of the present invention as to any sort of specific physical implementation. Its use and details are secondary, since the use of data acquisition and data processing are obvious technologies used everywhere today.

The "Overall Processor or Controller" block is the circuitry means required to perform all the overall control, interface and other functions required to get the invention to work. In reality, this block will contain a programmable microprocessor with the appropriate software programs required to control the invention. The use of a programmable processor here is important and relevant to the invention since a change of external disk interface circuitry means to accommodate a different type of disk interface will require a change in the Overall Processor or Controller means as well.

Figure 3:
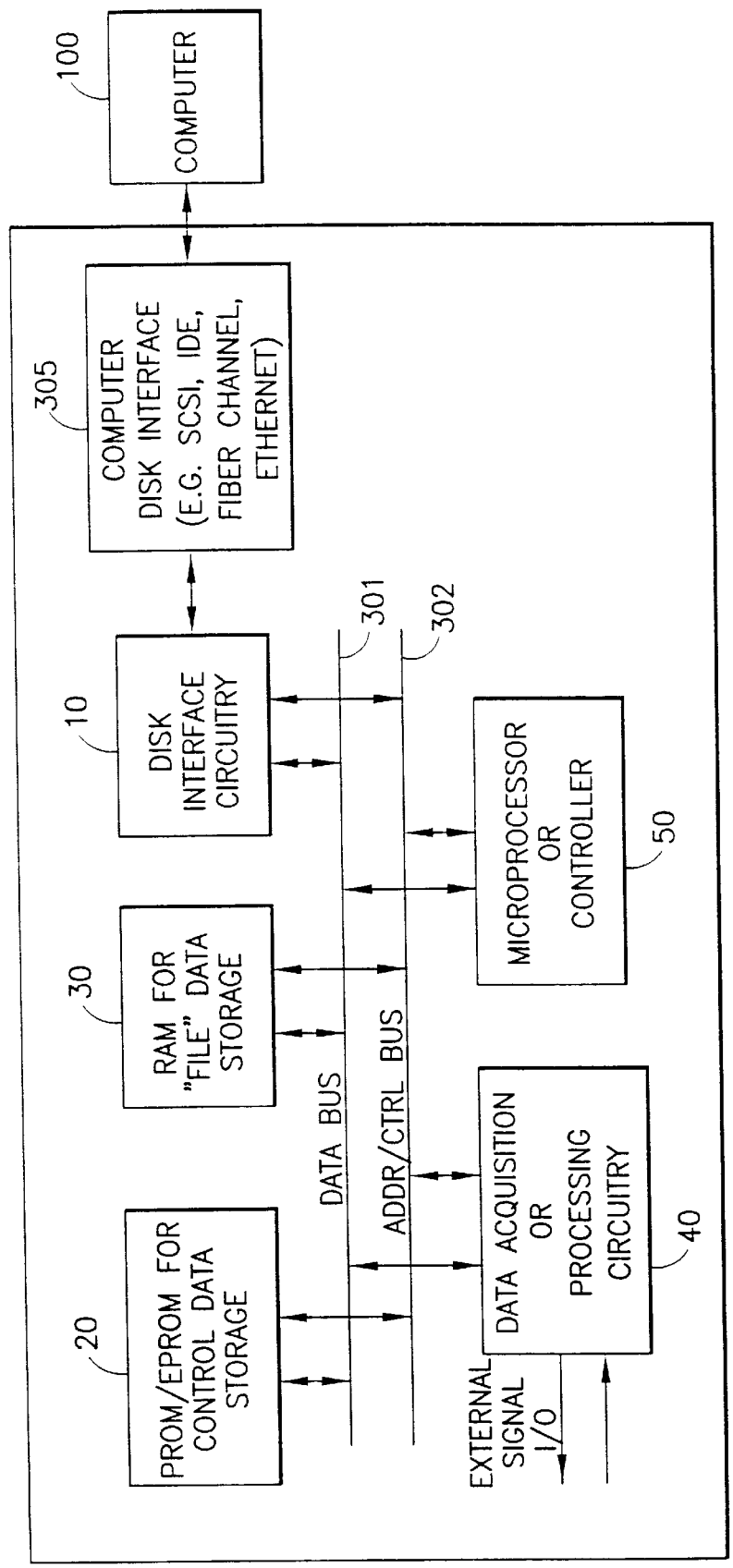
FIG. 3 is a block diagram of a specific embodiment of the apparatus according to the present invention.

As shown in FIG. 3, a number of interconnected functional blocks are required for implementing the present invention. Each block is connected by a data bus 301, which provides a control information and external signal (I/O) flow between the blocks to make the invention perform its intended functions. Further, an address and control bus 302 connects each block to provide data location information and general circuitry control among the blocks.

Figure 4:
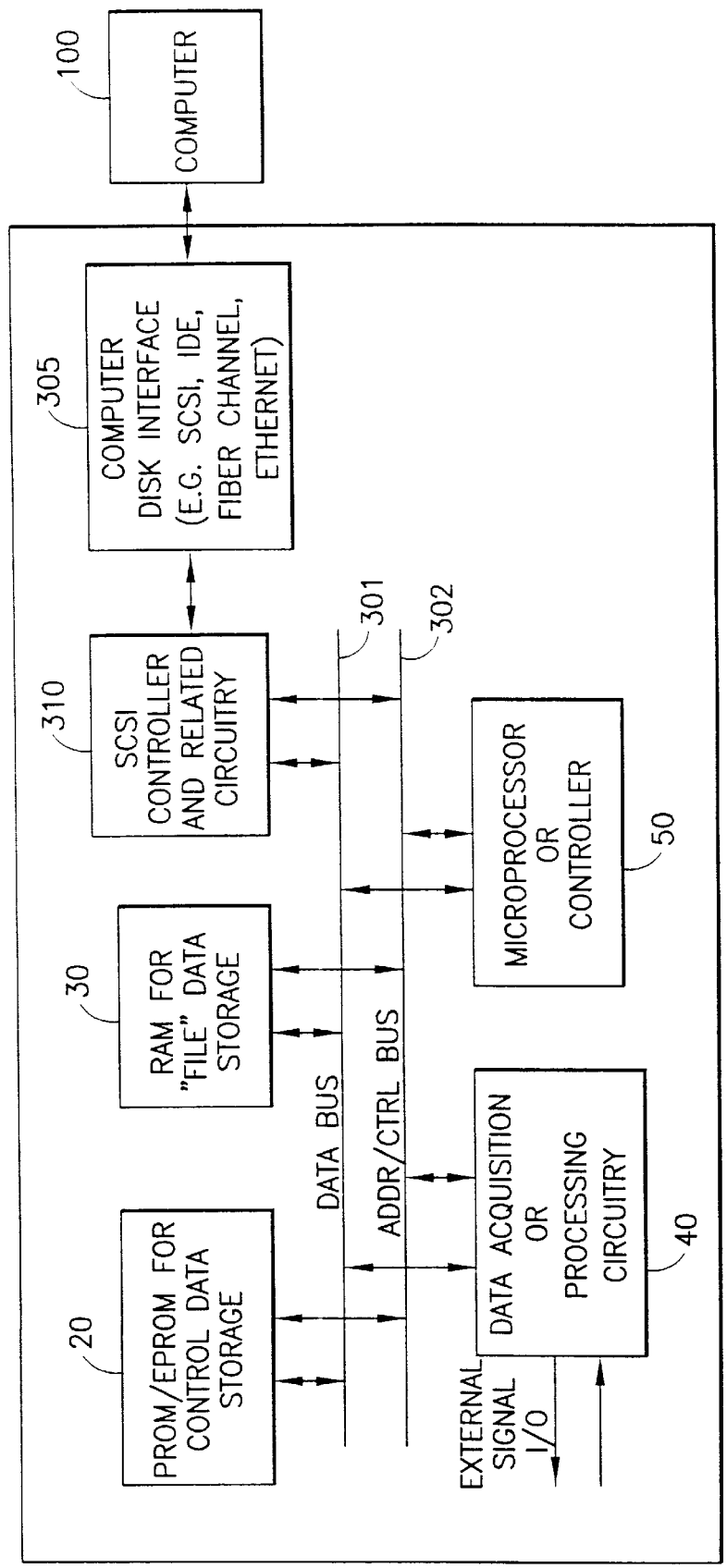
FIG. 4 is a block diagram of a SCSI interface embodiment of the invention.

An attached computer 100 will interface to the data acquisition section of the invention through the block marked "Computer Disk Interface" 305 as shown in FIG. 3. There are a number of possible embodiments envisioned for the disk interface 305. SCSI, or the Small System Computer Interface, is a common computer disk interface and suitable as a possible embodiment for this invention, and can be implemented as shown in FIG. 4.

Figure 5:
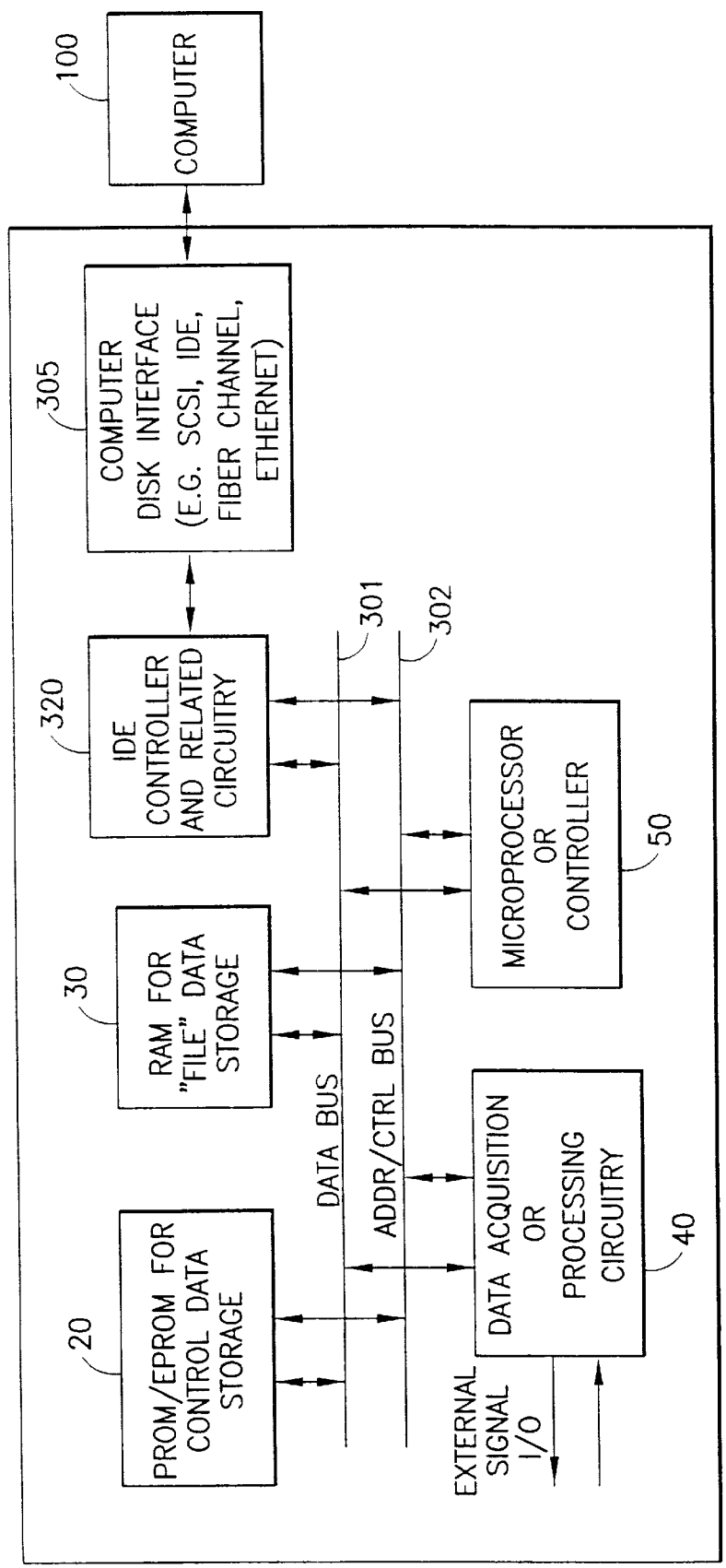
FIG. 5 is an embodiment of the invention for use with an IDE interface.

The IDE, or Integrated Device Electronics interface is another common computer disk interface, and it too would be a suitable embodiment for this invention. An example of such an implementation is shown in FIG. 5.

Figure 6:
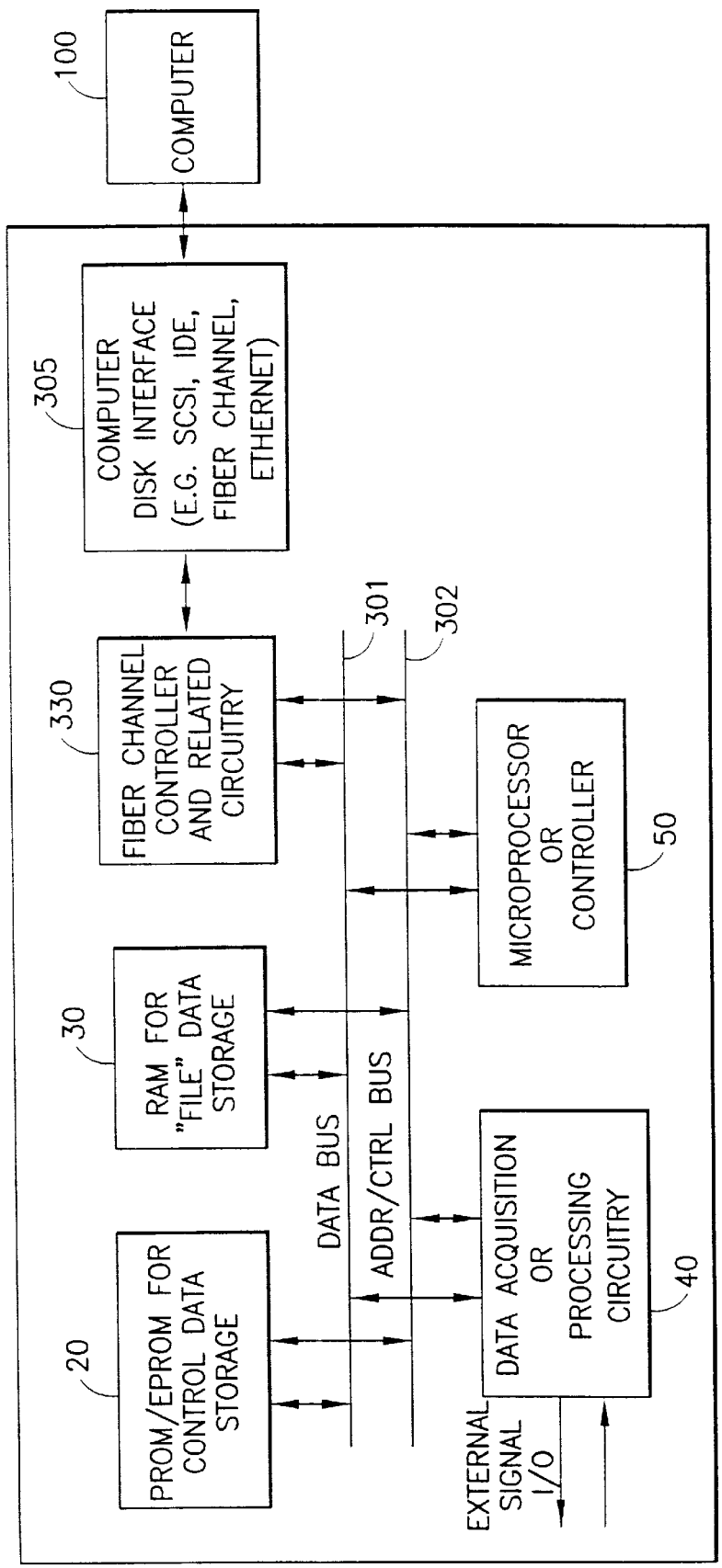
FIG. 6 is a block diagram of an embodiment of the invention using a fiber channel interface.

A third example of a possible embodiment for this invention uses a Fiber Channel interface 330 as shown in FIG. 6. In the Fiber Channel implementation, achievable disk speeds are usually higher than those available with the SCSI or IDE interfaces.

Figure 7:
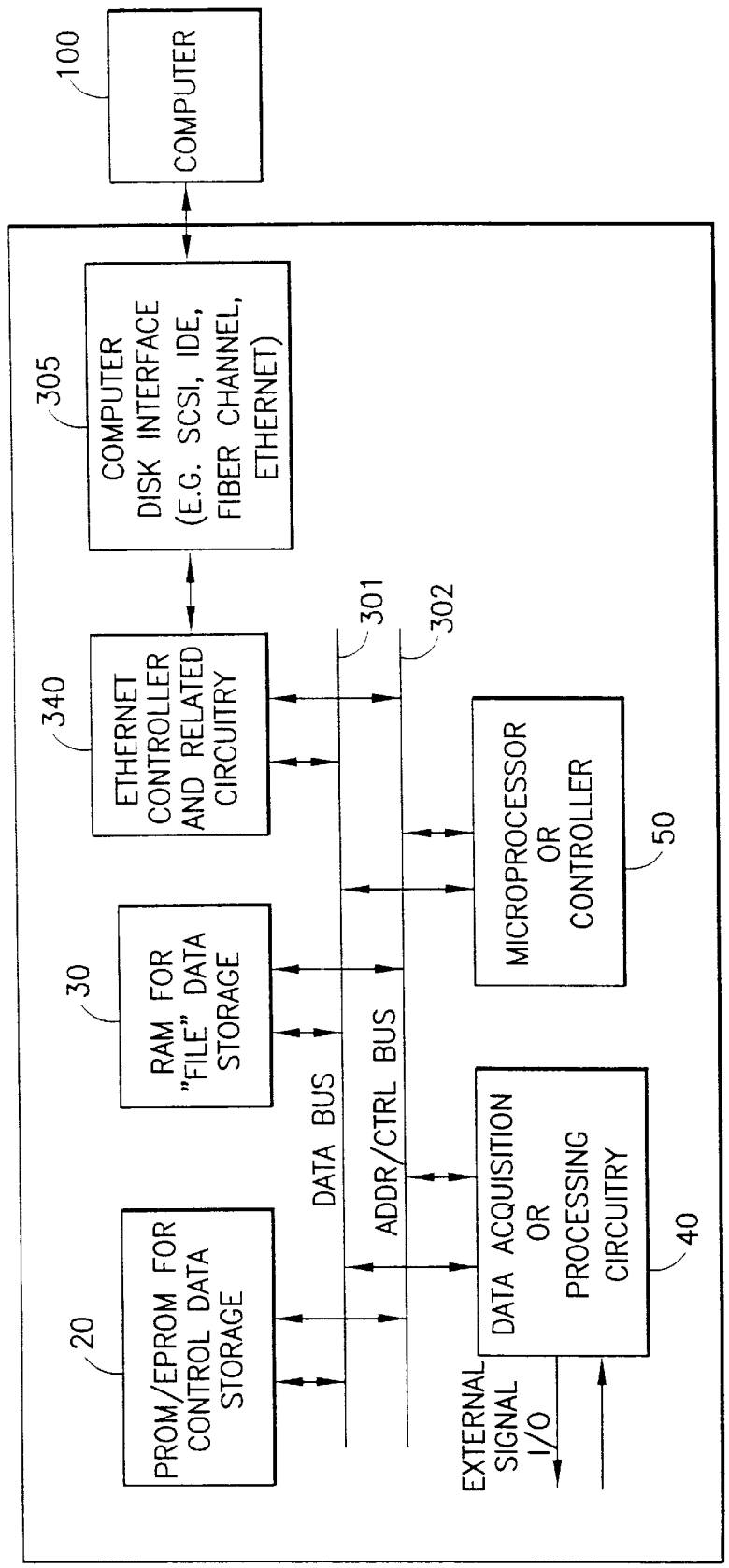
FIG. 7 is a block diagram of an embodiment of the invention using an Ethernet interface.

A fourth possible embodiment involves an Ethernet or similar networking interface 340 as shown in FIG. 7. Using this implementation, the invention will appear to be a "network disk", which is simply a disk that happens to reside on a computer network instead of being physically co-located near, and cabled directly to, the computer.

The following general description of the operation of the present invention makes reference to FIG. 3, the basic Invention Block Diagram (Detailed) without regard for the particular computer interface embodiment (SCSI, IDE, Ethernet, etc.) actually implemented.

For each particular computer type that the invention works with, one or more tables of information will be generated and stored in the apparatus of the invention. This table or tables is/are referred to as a particular computer's "disk personality" or "personality", and represents a categorizing of disk blocks. As shown in FIG. 3, a block marked "Memory for Control Data Storage" 20 will store these tables.

In normal operation, a computer reads and writes blocks of data using a disk to accomplish the functionality of disk I/O. Some of these blocks contain control information relevant to disk operation and usage, such as directory information, time and date stamps, subdirectory pointers, etc., and some of the blocks contain file data whose format and purpose are specific to the program using that data.

Using a number of simple disk read/write utility programs, one can determine, on a block-by-block basis, which blocks on the disk contain control information and which contain file information. This categorization of disk blocks into control blocks and file blocks is fundamental to the operation of the present invention.

When an attached computer requests a block of data from the data acquisition system of the present invention (the invention appears to the computer as a disk), and that data represents blocks of data which the computer knows to contain file data, a special operation occurs. Data from internal data acquisition circuitry or data processing circuitry is substituted for the file blocks normally accessed from a disk file, and presented to the computer in the same manner as file blocks. This data has been previously stored by the system of the invention in the block marked "Memory for 'File' Data Storage" 30 in FIG. 3.

Using this technique, external signal I/O can be done with the same ease and efficiency as normal file I/O.

Since all of the blocks in FIG. 3 are connected by a data bus 301 and an address/control bus 302, data from external signal I/O can be efficiently transferred from the "Data Acquisition or Processing Circuitry" block 40 to the File Data Memory 30 or the Disk Interface Circuitry 310 as required. The "Overall Processor or Controller" block 50 contains sufficient circuitry and/or processing software to manage and control the invention operations required in carrying out the present invention.

When a new computer operating system or hardware system becomes available on the market, it can easily perform signal I/O by generating a new "disk personality" table for the new system, storing it in the memory 20 of the apparatus of the present invention, and implementing the appropriate disk interface between the data acquisition system of the present invention and the computer.

The embodiments of FIGS. 4–7 operate in the same manner as the embodiment of FIG. 3, the only difference being the type of interface provided for interfacing with the computer 100. In the following, only a detailed discussion of FIG. 3 is given.

Now a detailed description of the invention's operation, usage and functionality of the data acquisition system of the present invention is provided. This discussion is divided into topics to make it easier to follow and understand. These topics include:

Overview of disk drive data organization

Importance of computer-specific disk formatting and file system details.

Invention block diagram and functional blocks

Invention's data mapping process

Invention's data movement for reads and writes

Invention's control handling

Overview of Disk Drive Data Organization

As described above, all computer disk drives are block-oriented devices, meaning that any data that gets written to them or read from them is done so in a block of a certain fixed size, instead of on a character-by-character basis. This technique has its origins in the early days of computers, when mass storage was both slow and expensive, and was designed in an effort to boost system performance.

From an interface circuitry perspective, disk I/O (input/output) can be divided into (i) interface control and (ii) management operations and actual data transfer operations. This can be thought of as getting ready for and attending a big party or dance. One spends a lot of time getting ready for a party, by showering, getting dressed, applying makeup, driving to the event, etc. and then more time attending the event. Disk I/O transfers have a similar arrangement. A portion of time is spent in communication between the system and a disk device relaying what is needed to accomplish a subsequent I/O transfer operation (reads, writes, positioning the media, etc.), with the rest of the time being spent in actually transferring data back and forth. For high system performance, the ratio of time spent on control functions to the time spent on actually transferring data should be very low.

By performing disk I/O using blocks of data instead of using individual characters or numbers, the ratio of control function time to data transfer time can be made very low. Therefore, all disk drives are block-oriented devices instead of being character-oriented devices.

The present invention takes advantage of the fact that disks are indeed block-oriented devices.

If one writes a letter using a Word Processing program, for example, and that letter only contains a few characters, for example, something like "Hi Joe", the letter can be stored on a disk storage media for later viewing, editing or printing. The disk storage media that receives this letter for storage will receive from the computer an entire block of data, typically 512 characters, for storage, even though only a few of the 512 characters have meaningful information. The rest of the block contains other characters which are not important to the letter, but which are used as filler characters to round out the letter to a full block size (i.e., 512 characters).

The way computers keep track of how much information in a block is important and how much is filler data is through the use of file pointers and other control information. These pointers and control information are also stored in blocks of data, but on other areas of the disk reserved for this information. Exactly where the control information is stored on a disk and in what format it is stored is of no concern to the person writing the letter.

A software program called an Operating System manages and keeps track of all the related control information for files necessary to perform basic computer operations. It is important to realize that the control information (separate from actual file data like the word processing letter described above) stored on a disk is unique and can only be understood and used by a computer of the same type as the one that generated the control information in the first place. For example, disk control information put on a disk by an IBM-PC computer will appear to be junk (i.e., will not be understandable) to a Macintosh computer, and vice-versa. An engineering workstation that has an attached disk cannot use its disk on an accounting system made by a different manufacturer using different computer chips and so forth.

Importance of Computer-specific Disk Formatting and Files System Details

When a computer manufacturer or a computer buyer adds a disk drive to a system, a number of steps are required to prepare the disk for use. First, the disk has a specific set of control blocks written to it that act as a roadmap of the device, allowing the system to know where to put its control data and where to put its file data.

This set of specific control blocks is called a disk's "partition" or "partition information" or "partition blocks". They serve as a digital roadmap for the system to use so that data written to the device can be retrieved in an organized, repeatable manner. Partition information is the first piece of an overall set of control blocks called a "file system". A computer's file system encompasses control information for directory tables, time and data stamps on files, actual file data, and other file attributes such as a "deleted" status bit, a "read-only" attribute bit, and an archive bit used by backup storage programs.

Every computer running a unique operating system has a unique file system. Some operating systems can use and interpret file systems from other systems, such as Windows-95 being able to use a disk taken from a system using the DOS operating system, but the reverse is not true. A DOS system cannot interpret or use the extra control information generated for the Windows-95 file system.

The data acquisition system of the present invention makes use of the fact that (a) all disks are block-oriented devices, and (b) that each system has a unique set of partition and control information blocks.

Formatting is a second step after installing a partition on a disk. Formatting needs to be done before a disk is ready for use. Formatting is a procedure whereby special software programs analyze a disk's partition information and add additional control blocks as needed to complete the generation of a working file system.

Invention Block Diagram and Functional Blocks

As stated above, FIG. 3 is a functional block diagram of the invention. It appears to have the structure and design of an ordinary small computer, with the same functional blocks such as a microprocessor, RAM, ROM, I/O devices and other associated circuitry. In fact, the heart of the invention is indeed a small computer that runs software programs as part of accomplishing its functions.

The first step in describing the operation of the present invention is to discuss an operation called the "data mapping" procedure, which is discussed next.

Data Mapping Procedure

A Data Mapping Procedure is a series of steps that must be performed as part of the implementation of the present invention, during the development stage. It includes procedural steps a developer must take that results in special blocks of data which are required for the invention to operate as intended.

As described above, a computer disk contains blocks of control information and blocks of actual file data. A disk partitioning step and a disk formatting step are required before a disk is ready for use by a system. Finally, the file system information present on a disk is unique only to the system type that generated it, and with only a few exceptions, to a system running the same operating system.

The basic operation of the data acquisition system of the present invention involves passing data and control blocks back and forth between itself and an attached computer in such a manner that the invention is emulating a disk drive. The emulation will be so good, in fact, that the computer actually believes that a disk is attached to it and not a data acquisition system.

Figure 8:
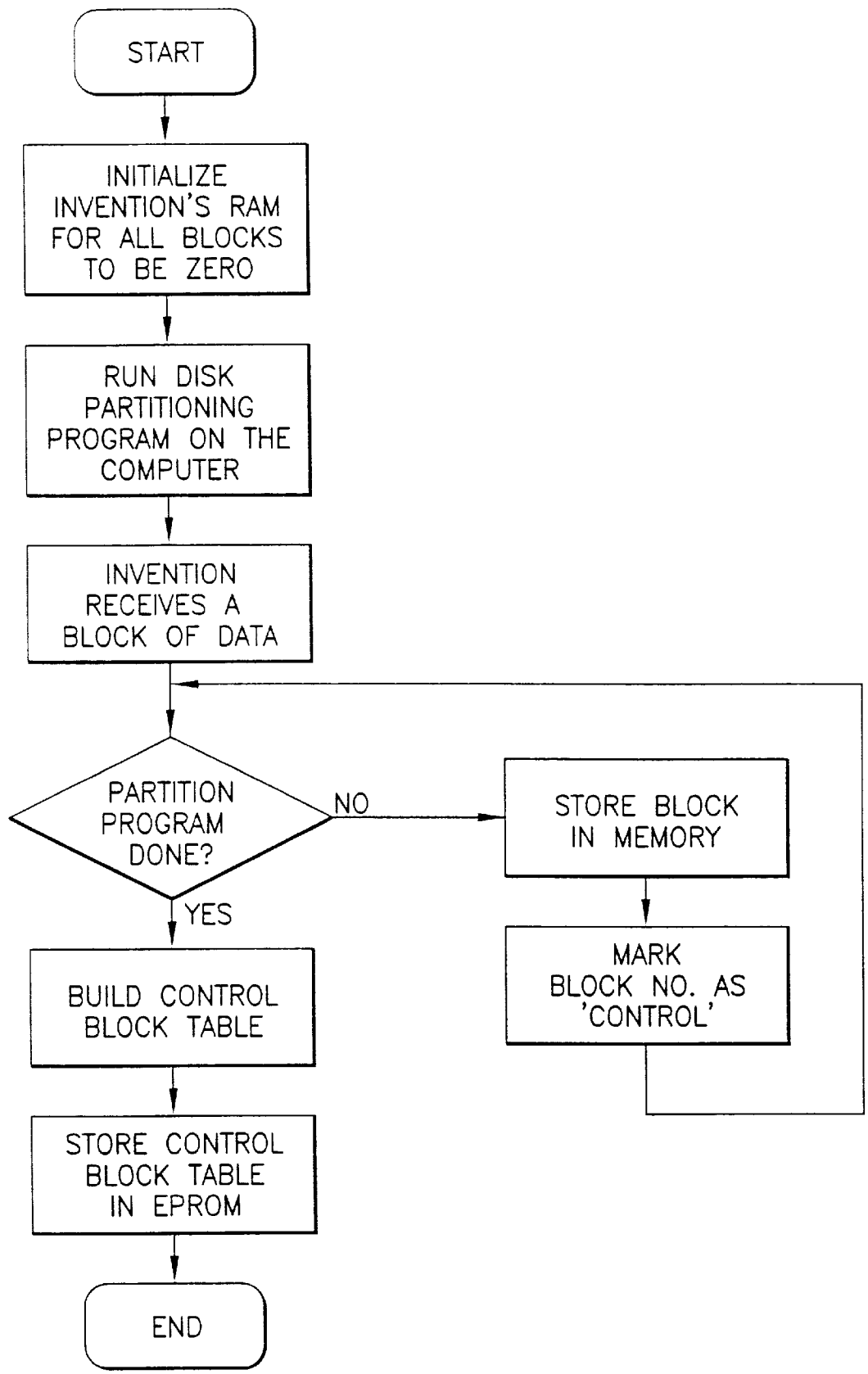
FIG. 8 is a flow chart showing first steps in a data mapping procedure.

The first step in making the computer believe that the invention is a disk is to gather, map and categorize blocks of data according to whether they represent control data (partition information, file system information, file attributes, etc.) or actual file data. This is done using a 3-step procedure shown in the flowcharts of FIGS. 8, 9 and 10.

At the completion of the Data Mapping procedure, a table of data blocks will exist that represent all the control information required for the system to have partitioned a disk for use. The contents of the data are not required to be known by the invention for the invention to work—it is only necessary that all the blocks that the system writes to the data acquisition system of the invention during the partitioning process be saved and stored.

Figure 9:
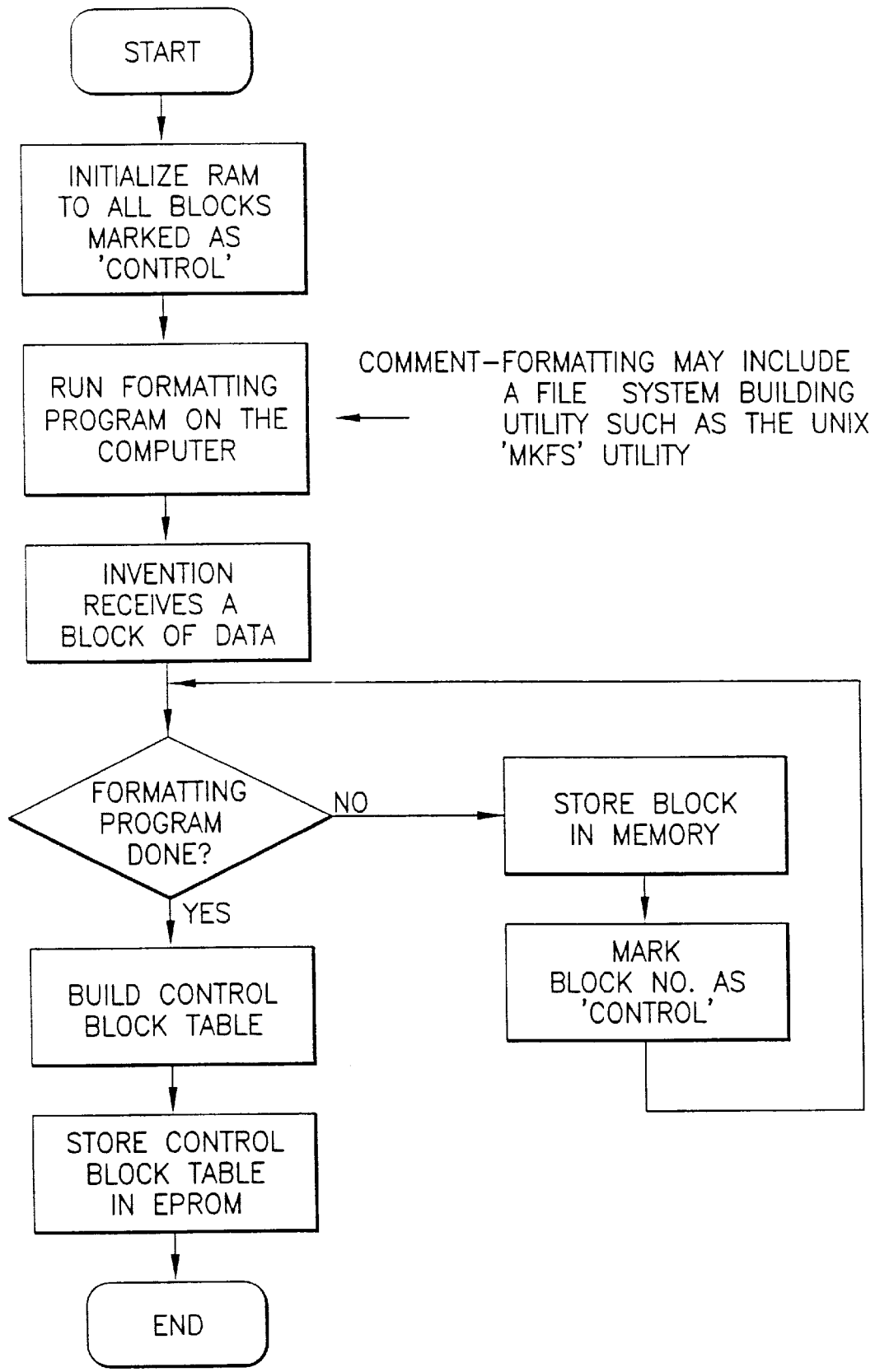
FIG. 9 is a flow chart showing second steps in a data mapping procedure.

Following the partitioning steps, similar steps will again be done while the system performs a formatting procedure and builds what it believes to be a file system on the data acquisition system of the invention, as shown in FIG. 9.

Figure 10:
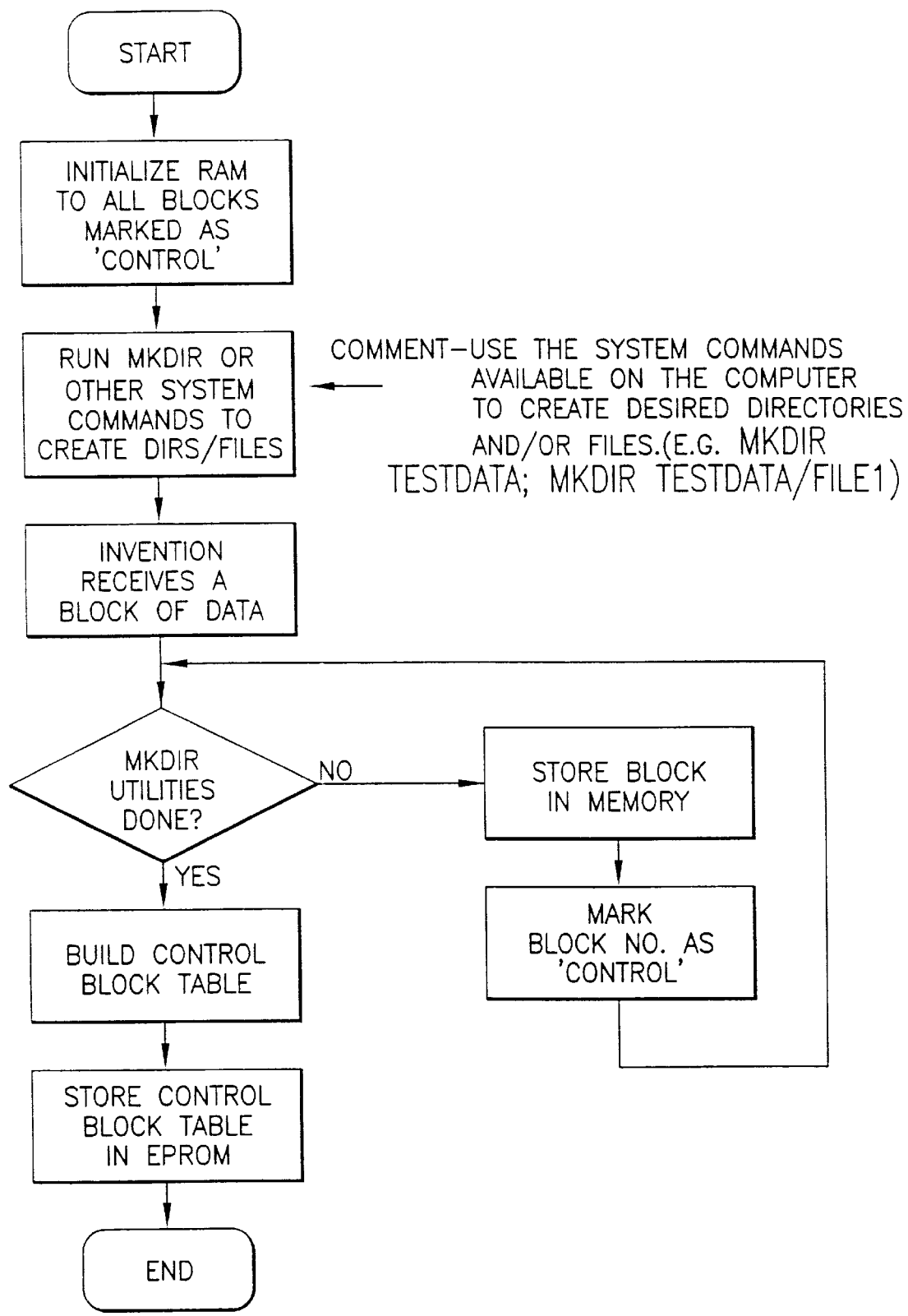
FIG. 10 is a flow chart showing additional steps in the data mapping procedure.

A final third step is required in the data mapping procedure as shown in FIG. 10. This step involves creating any required data files and/or directories or subdirectories on the data acquisition system of the invention as needed.

At the completion of the Data Mapping procedure (FIG. 10), the data acquisition system of the invention will have captured and stored all the control blocks the computer has written to it and thus, they represent the "personality" of the complete file system of the disk "drive" that the data acquisition system of the invention is emulating. During real-time operation of the invention which is described next, these control blocks can be retrieved and passed to the computer when requested, as discussed in the next section.

Data Movement for Reads and Writes

As shown in FIG. 3, a number of functional blocks are required for operation of this invention. The microprocessor or controller 50 controls and directs the operation of the invention by running specially developed software programs. The data blocks containing control information that were generated during the Data Mapping Procedure (FIG. 9) discussed earlier are stored in the PROM/EPROM circuitry (device) 20.

Of the total number of data blocks that a host computer 100 finds to be installed on the data acquisition system of the invention, some are control blocks and the rest are called "file data". "File data" comprises blocks of information gathered from and passed to the data acquisition or processing circuitry 40 and stored in the RAM 30. This data will be discussed further a little later on.

Disk interface circuitry 10 contains interface circuits appropriate for the particular disk interface implementation chosen for the data acquisition system of the invention. As stated in the overview hereinabove, a number of physical implementations are possible as embodiments of the data acquisition system of the invention. SCSI, IDE, Fiber Channel and Ethernet are all possible embodiments as disk interfaces. Specialized chips and electrical interface circuits are readily available for implementing all of these interfaces represented by the disk interface circuitry 10 in FIG. 3.

The computer disk interface 305 contains the necessary connectors, signal wiring and other systems (devices, circuits, etc.) to physically connect the data acquisition system of the invention to a host computer 100. The specifics of the connection will vary based on the particular interface (SCSI, IDE, etc) chosen, but in all cases, the connection will exist to allow the computer to "see" the data acquisition system of the invention as a disk drive.

Next, a sequence of events will be discussed that explain how the data acquisition system of the invention passes data to the computer 100 in such a manner as to appear to be a disk drive. The flowchart of FIG. 11 is referred to during this discussion.

Figure 11B:
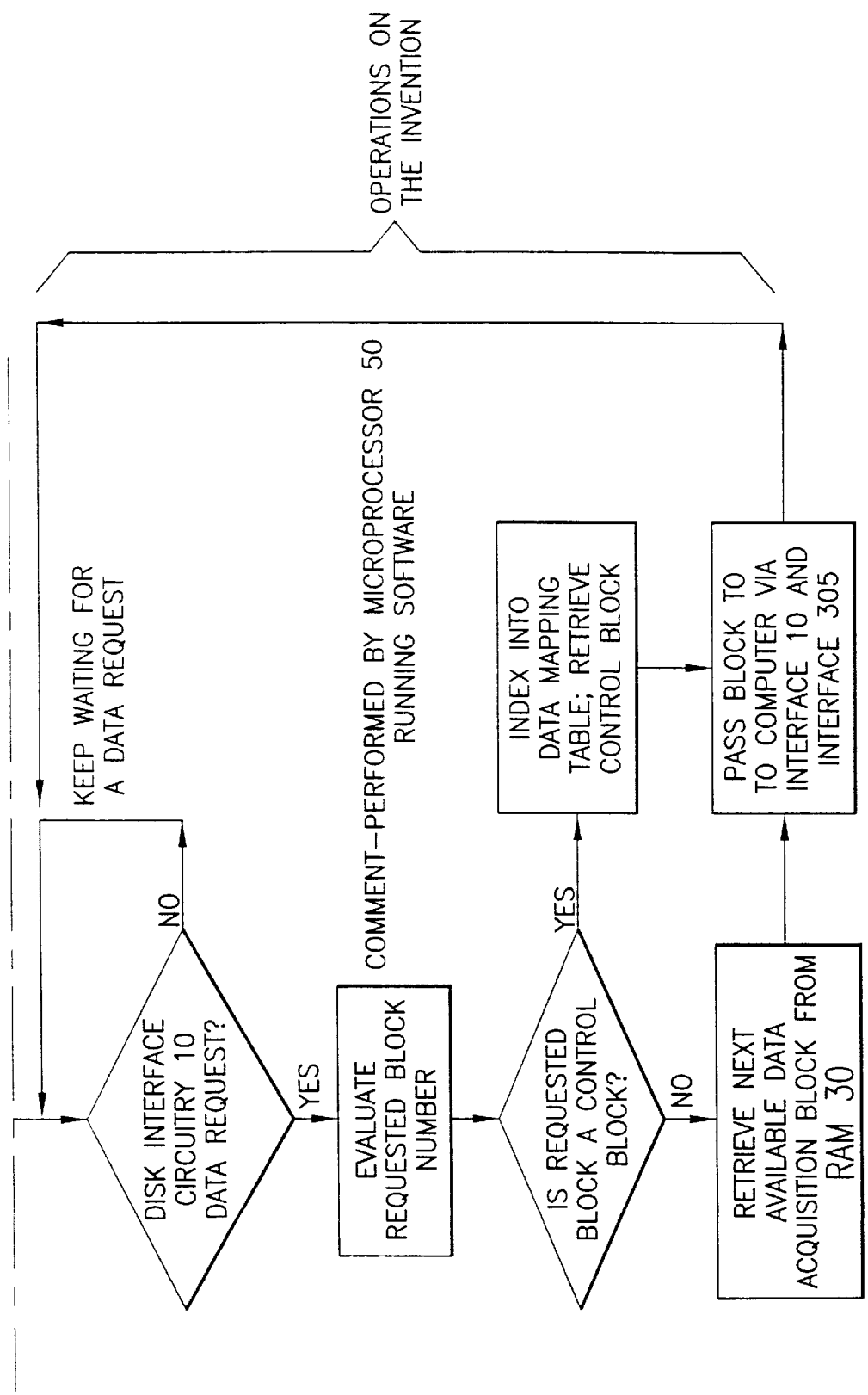
FIG. 11 is a flow chart showing how the system of the present invention transfers data to a computer.

The top three square boxes S1, S2, S3 in FIG. 11 represent a simple sequence of operations taken by a computer 100 in the process of reading what it believes to be a file of data on the data acquisition system of the invention. The remaining blocks in the FIG. 11 detail the operations the invention takes, using the microprocessor 50 (FIG. 3) and executing software, to return blocks of data back to the computer 100.

Figure 12B:
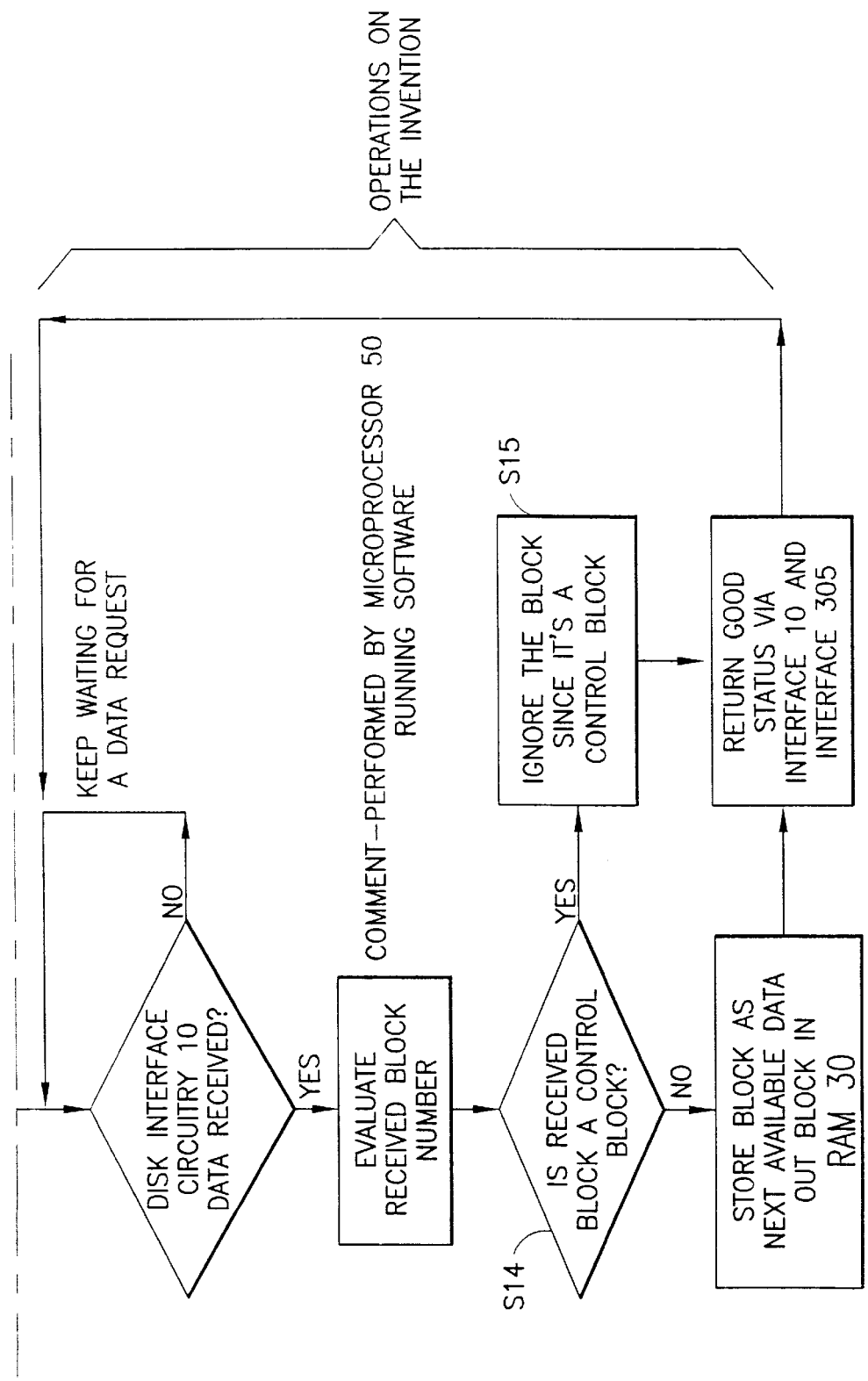
FIG. 12 is a flow chart illustrating a similar sequence of events as in FIG. 11, except for the case where the computer desires to write data to the system of the present invention.

FIG. 12 depicts a similar sequence of events as FIG. 11 except for the case where computer 100 wishes to write data to what it believes is a file on the data acquisition system of the invention. The top three square boxes S11, S12, S13 of FIG. 12 again illustrate common operations performed by computer 100 in the process of writing data to a disk file. Steps S14 and S15 in FIG. 12 show the events that happen in the data acquisition system of the invention when a control block is received by the data acquisition system of the invention during normal operations.

Since blocks of control data received by the data acquisition system of the invention represent the "personality" (partition, file system and file attribute structure) of a disk being emulated by the data acquisition system of the invention, it should not be changed dynamically; thus control blocks written to the device at this point are ignored.

Summary

It has been discussed above that the data acquisition system of the invention has stored in it, in PROM or in other memory devices, a number of blocks of data which have been generated by a Data Mapping Procedure. These blocks of data, called control blocks, are passed to computer 100, using the appropriate electrical signalling and protocols required by the electrical interface used, at the appropriate time when requested.

Other blocks of data, which originate in Data Acquisition/Processing circuitry 40 in the data acquisition system of the invention and get stored in memory RAM 30 are also passed to computer 100, using the appropriate electrical signalling and protocols required by the electrical interface used, at the appropriate time when requested. These data blocks, or "file" data, appear to computer 100 to be data taken from disk files, but in fact are from data acquisition circuitry in the data acquisition system of the invention.

Using this approach, any computer that performs data I/O using disk drives can perform data acquisition and processing using only the computer's basic Operating System software and no other required software. This technique is what makes the data acquisition system of the invention unique.

Invention's Control Handling

In addition to being able to pass blocks of control and file data between computer 100 and itself, the data acquisition system of the invention also must handle the required electrical signalling and protocols required for the disk interface used as the preferred implementation. This will be referred to as the invention's "control handling".

Control handling for the data acquisition system of the invention is provided by a suitable choice of disk interface circuitry 10 and connection and wiring (interface) 305. A number of readily available Integrated Circuits (ICs) provide all the required electrical signalling and other characteristics to make them interface properly with computer 100 in an industry-standard, working manner. SCSI ICs, IDE ICs Fiber Channel ICs and other circuits are readily available.

The remaining issue in the invention's control handling relates to software control of the various ICs available for disk interfacing. The manufacturers of the ICs, in all cases known to the present inventor, provide software packages for nominal fees or free of charge, that contain all the functionality required to make a working disk interface using their ICs.

Description of a Preferred Embodiment

Figures 13, 13A, 13B:
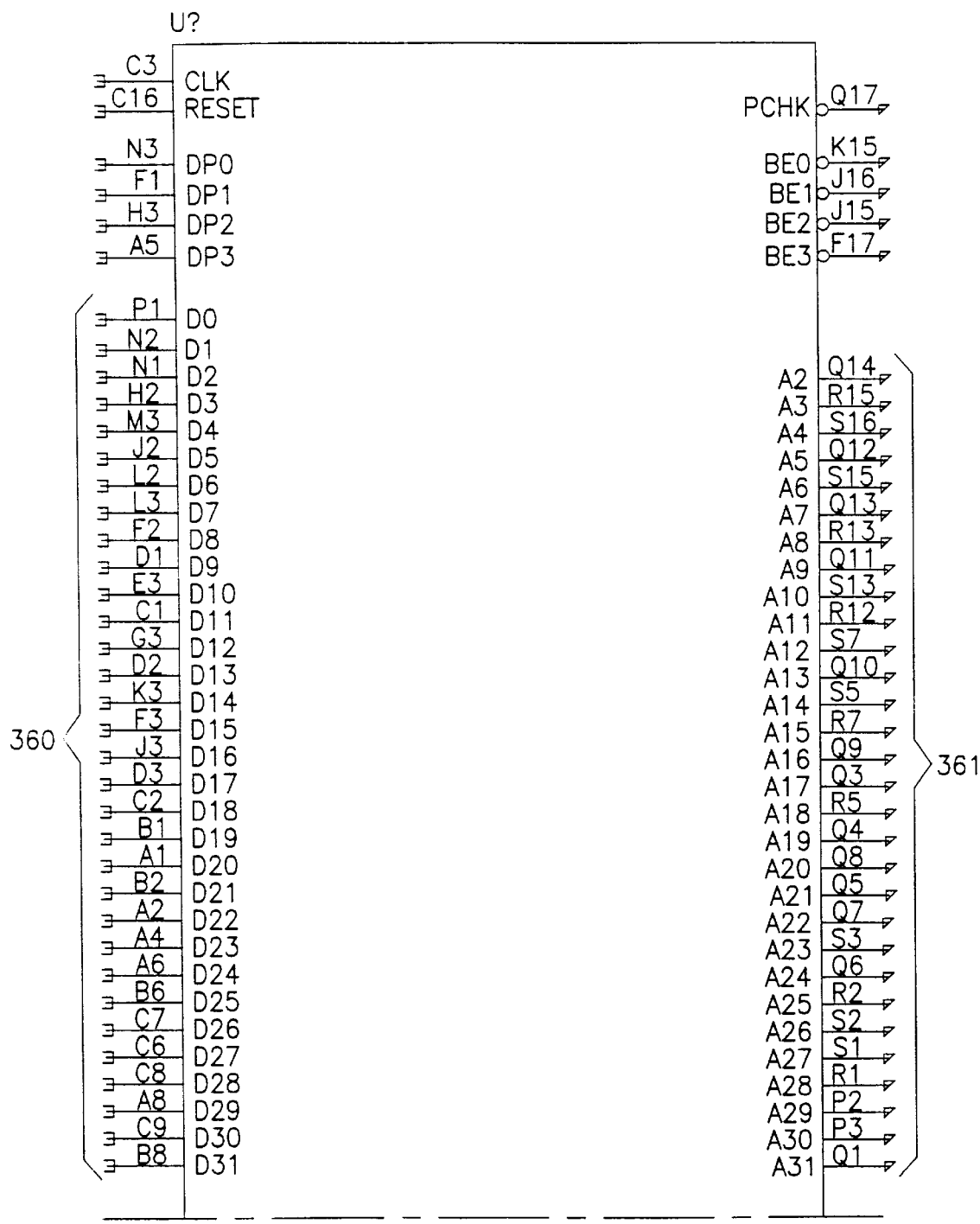
FIG. 13 illustrates a preferred embodiment of a microprocessor.
Figure 13B:
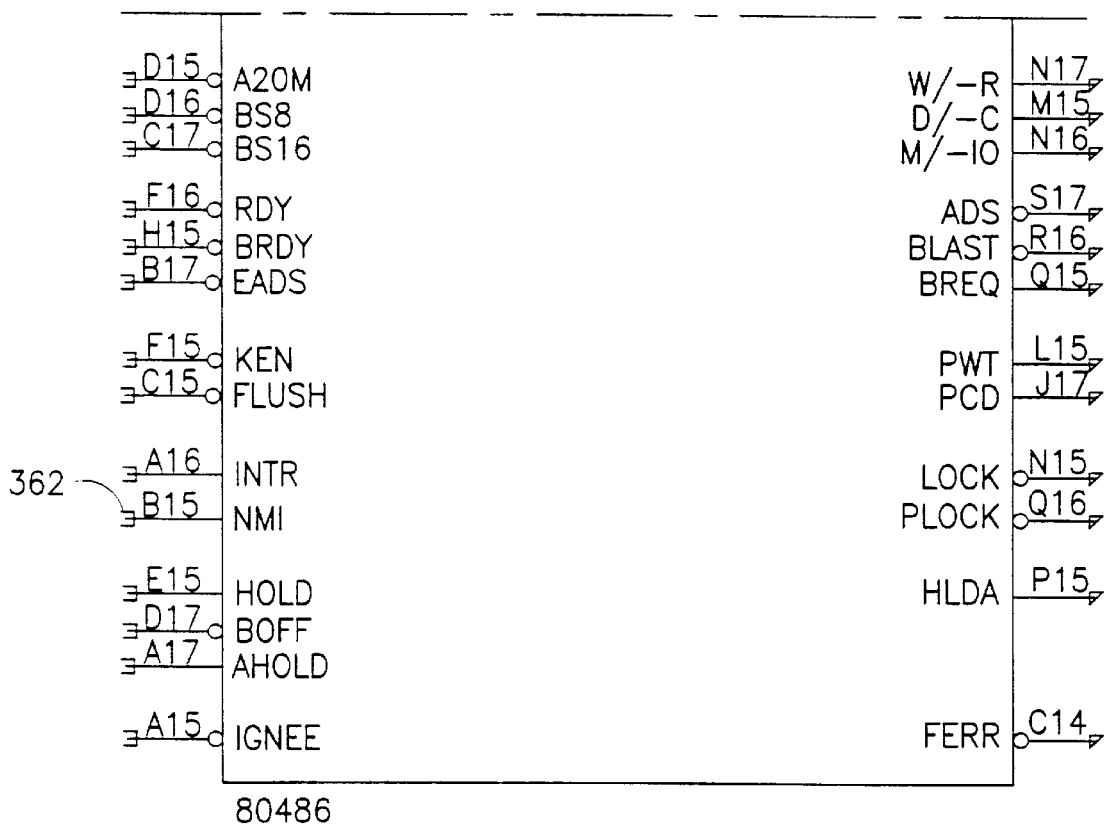

To present a clear picture of a preferred embodiment for this invention, which uses SCSI as a disk interface, circuitry diagrams that have their interconnection wiring not shown will be presented. As mentioned hereinabove, the specific disk interface chosen (SCSI, IDE, Fiber channel, Ethernet, etc.) will only be of secondary importance to the focus of the data acquisition system of the invention. FIG. 13 is an example embodiment of a microprocessor 50 used to control and manage the other circuitry present in the invention. This device is made by Intel Corporation, Santa Clara, Calif., USA, and is widely available. Alternative devices that are software-compatible are available from no less than 2 other manufacturers.

Figure 14:
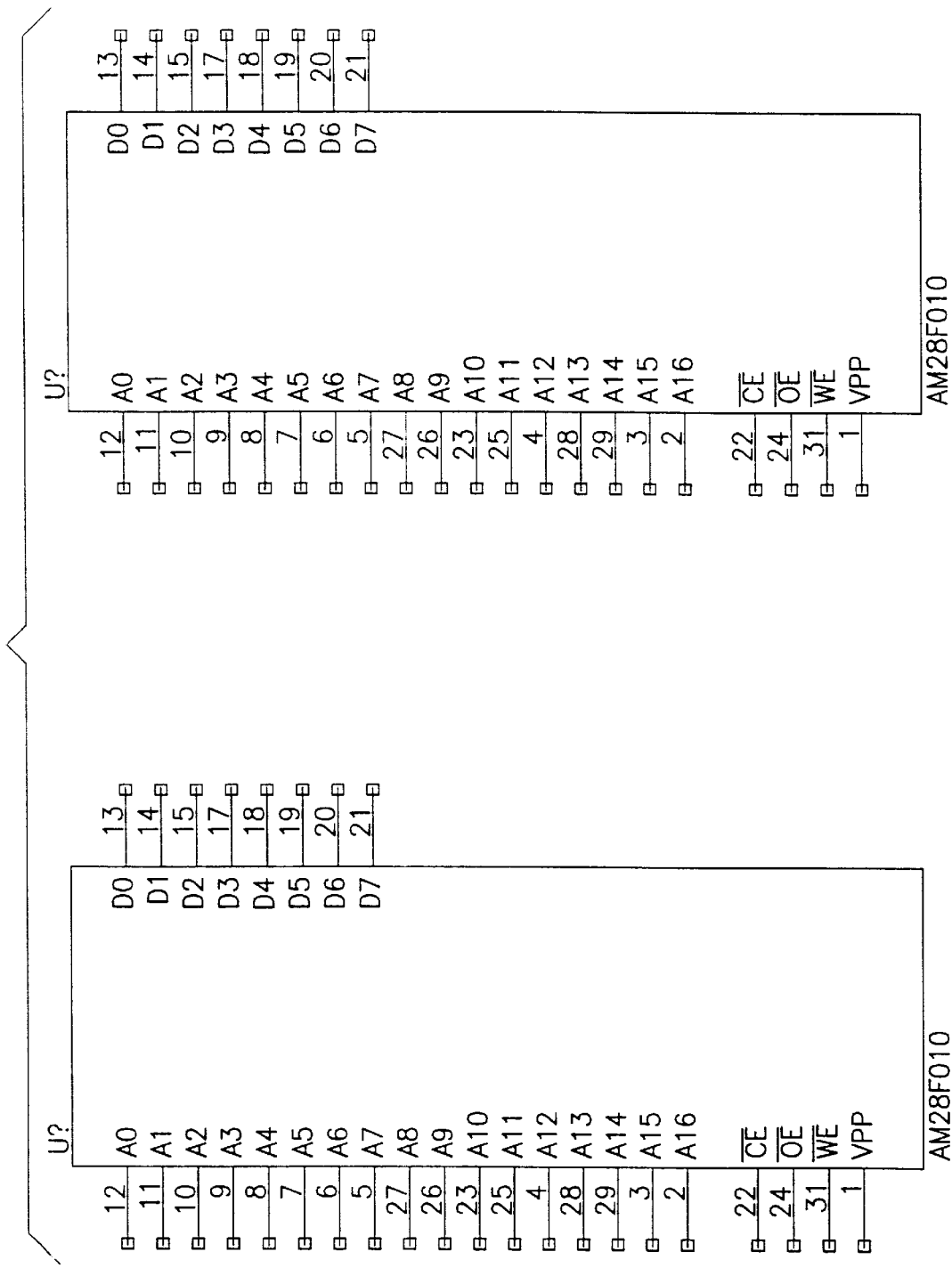
FIG. 14 illustrates a preferred embodiment of a PROM.

FIG. 14 is an example embodiment of the PROM 20 used for storing control data blocks. Such devices are commonly available ICs made by Advanced Micro Devices of Sunnyvale, Calif., USA and over a dozen other vendors.

Figure 15:
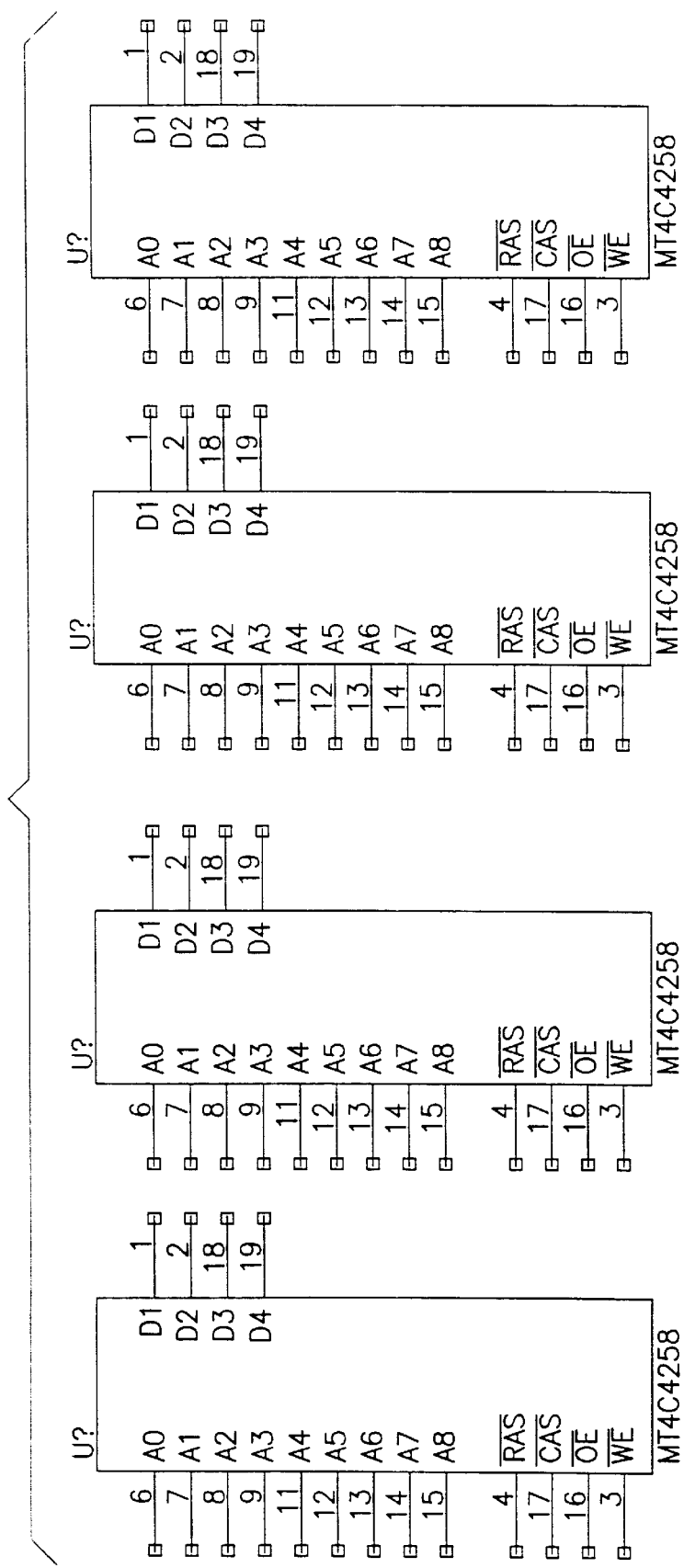
FIG. 15 illustrates a preferred embodiment of a RAM.

FIG. 15 is an example embodiment of the RAM 30 used for storing "file" data received over its data bus from the Data Acquisition/Processing unit 40. These devices are Dynamic RAMs (DRAMs) made by Micron Technology, Inc., Boise, Id., USA and many other manufacturers. Other RAM devices could be used.

Figure 16A:
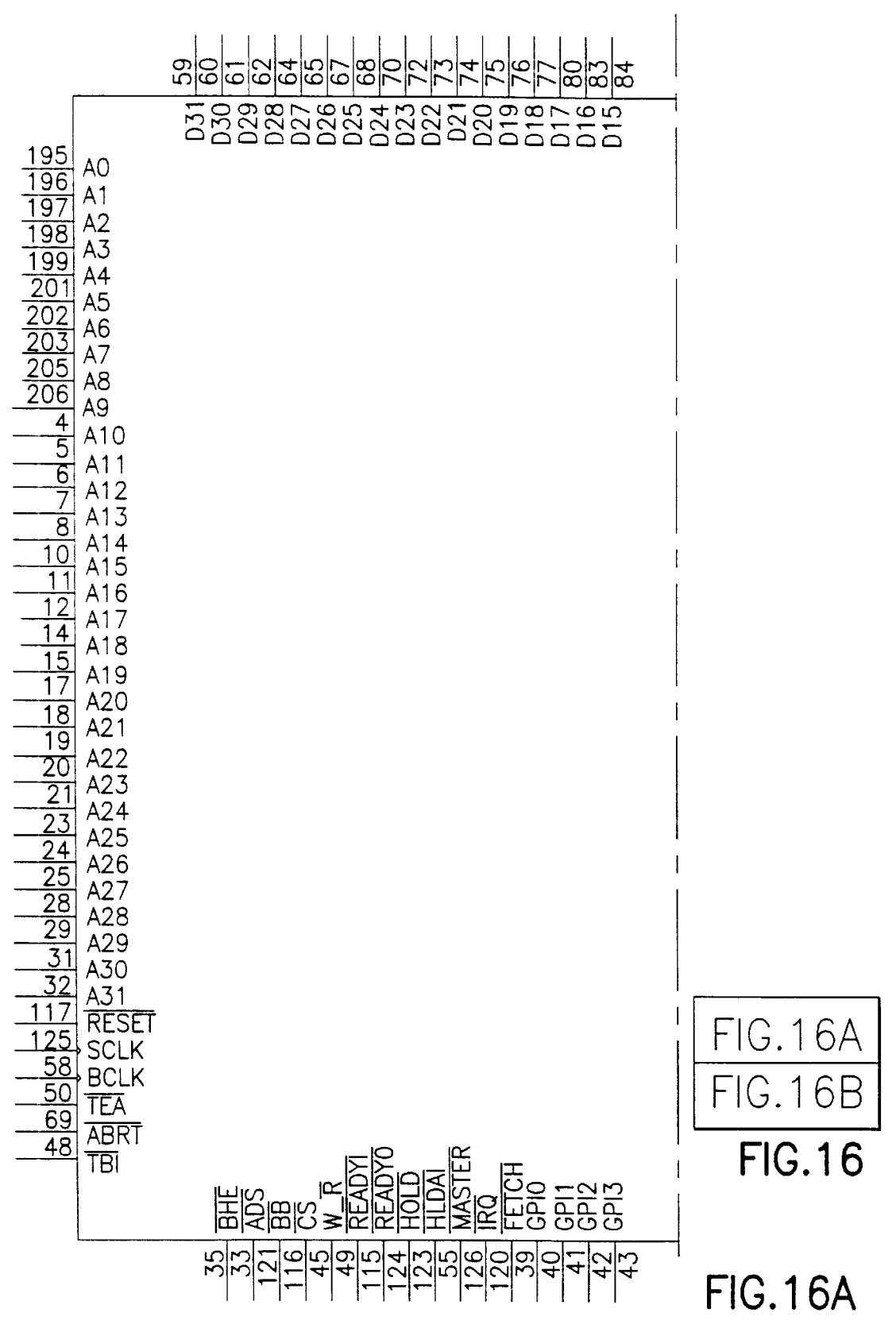

FIG. 16 is an example embodiment for the Disk Interface Circuitry 10 when SCSI is chosen as the disk interface implementation. This device is a very highly-integrated IC made by Symbios Logic, Colorado Springs, Colo., USA and handles almost all the required control for the disk interface function of a SCSI device with a single IC. Other manufacturers make similar devices that could be used as well. The author prefers this part for the invention.

Figure 17:
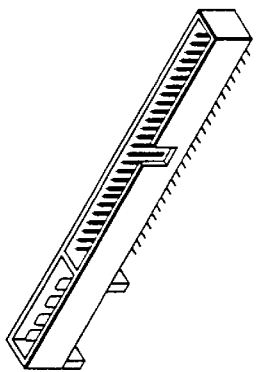
FIG. 17 illustrates a preferred embodiment of a disk interface connector.

FIG. 17 is an example embodiment for the Computer Disk Interface 305. It is a dual-purpose electronic connector commonly available for use with SCSI devices and combines a 4-contact power connector with a 50-contact signal connector, all in the same small assembly. Other manufacturers make a similar device.

The data bus 360 of the Microprocessor 50 of the invention is the primary path for data to flow during execution of software performing the invention's functions, as well as for data to flow between the PROM 20, RAM 30 and the Disk Interface 10. This data bus is 32-bits wide.

The address bus 361 of the Microprocessor 50 provides address information used for selecting control data blocks in the PROM 20, the RAM 30, and for controlling the Disk Interface 10. Additionally, address bus 361 is used for addressing overall software used for invention control and management.

Microprocessor 50 has an interrupt signal 362 that gets driven by the interrupt signal of the Disk Interface 10 when data blocks are received or need to be transmitted, or when special control conditions require microprocessor attention. The use of an interrupt is very common prior art, but allows for efficient data transfer throughout the system. Additionally, other circuitry may use this interrupt signal for other purposes as required.

While the above discussion has been given with respect to FIG. 3, similar operations apply in connection with the circuit diagrams of FIGS. 4–6, as should be apparent.

One example of the type of Data Acquisition (DA) typically performed by the system of the present invention is the recording of sonar signals aboard Navy ships. This sonar data, once recorded, is used for both navigational purposes (much like the radar aboard commercial aircraft) and military purposes.

Figure 18:
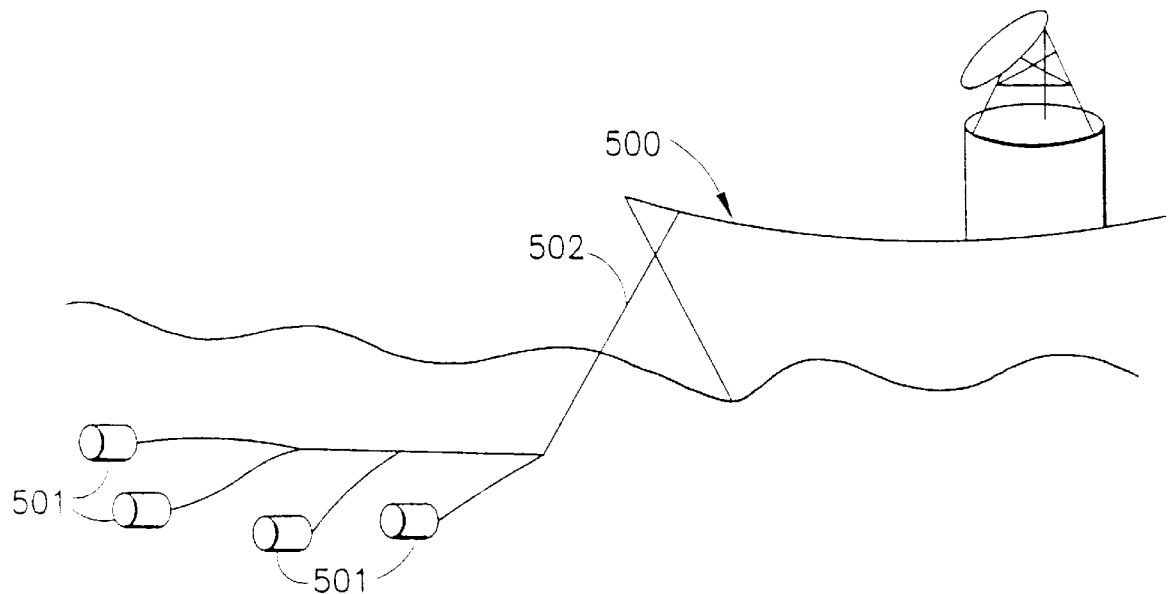
FIG. 18 shows a typical example of the present invention as applied to ships.
Figure 19:
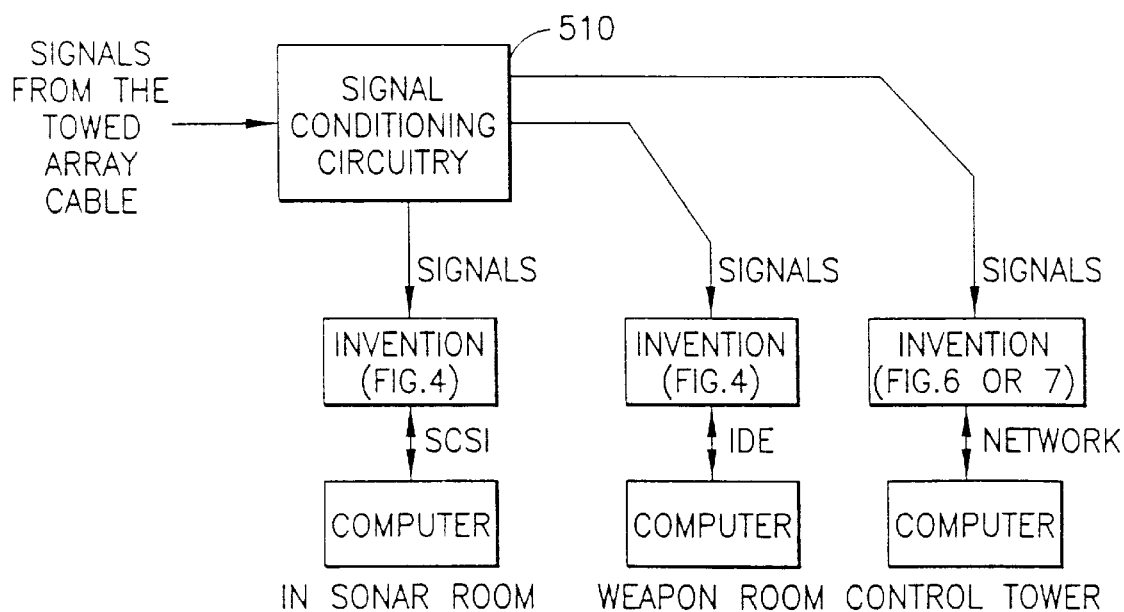
FIG. 19 shows a schematic block diagram of the equipment on the ship of FIG. 18.

FIG. 18 shows a typical working example of the system of the present invention, wherein a ship 500 is towing an array of underwater microphones 501 (called hydrophones) in the water behind the ship. The cable 502 connecting the ship and the hydrophones supplies both power and signals to and from the array of hydrophones 501, respectively, as well as acting as an attachment device. The cable 502 may be, for example, up to 10 about miles long for some sonar systems. The hydrophones 501 receive acoustic signals from the ocean, the towing ship 500 itself, wave noise, other ships in the area, and surrounding underwater mountains and the seabed. The signals picked up by the hydrophones 501 propagate up the cable 502 to signal conditioning circuitry 510 (see FIG. 19) located onboard the ship 500. The outputs of the signal conditioning circuitry 510 are fed to data acquisition or processing circuitry 40 of the various embodiments of the invention, for example those of FIGS. 4, 5, 6 or 7, as indicated in FIG. 19. The type of interface (SCSI, IDE, NETWORK, etc.) determines which embodiments (FIGS. 4, 5, 6 or 7) is used, as shown in FIG. 19.

Because Navy vessels (ships) have a relatively long lifetime, usually many tens of years, computers and other electronic gear aboard the vessels wears out, becomes obsolete or simply gets upgraded with more modern equipment. This constant upgrading of equipment causes a situation whereby many different makes and models of computers may be in use at the same time. Each computer may use a different hardware interface for accepting signals from the sonar signals generated by the underwater hydrophones, thereby making a standard sonar signal interface impractical and expensive.

Every computer does have a disk interface, however, as part of its normal operation, and therefore can very easily and simply use the data acquisition system of the present invention to perform data acquisition and record the sonar signals. Further, because the heart of the technique of the present invention makes the acquired signals received by the system look like normal "file" disk drive data, no special software is required on any of the onboard computers to view, process and/or analyze the sonar data.

While the invention has been described above with respect to specific embodiments and implementations, various modifications and alterations can be carried out by one skilled in the art, and various features of the different embodiments may be combined, as required or desired, within the scope of the invention as defined by the appended claims.

I claim:

1. A data acquisition and data processing system that emulates a disk drive, from a hardware perspective of an attached computer, having a data bus and address/control bus, the system comprising:

a microprocessor coupled to the data bus and the address/control bus for overall control of the system;

data acquisition and processing circuitry coupled to the data bus and address/control bus;

a non-volatile memory coupled to the data bus and address/control bus, and being adapted to store data records which include disk drive control and file system information;

a random access memory coupled to the data bus and address/control bus, and being adapted to store data acquired by the data acquisition and processing circuitry in a specially formatted manner; and disk interface circuitry coupled to the data bus and address/control bus, and being adapted to interface with the attached computer such that the system appears to the attached computer as a disk drive.

2. The data acquisition and data processing system according to claim 1, wherein said disk interface circuitry controls transfer of data to and from the attached computer such that data being transferred to the attached computer appears to the attached computer to be file data from a disk drive wherein the system appears as a disk drive from a software perspective of the attached computer.

3. The data acquisition and data processing system according to claim 1, wherein proprietary hardware is not required to couple the system to the attached computer.

4. The data acquisition and data processing system as defined by claim 1 further comprising a standard I/O file interface for use by the attached computer to control the data acquisition and processing circuitry, wherein:

the attached computer configures operating parameters of the data acquisition/processing circuitry;

the attached computer reads an operational status of the data acquisition/data processing circuitry;

the attached computer upgrades or updates internal firmware or software in the data acquisition and data processing system using the standard I/O file interface;

the attached computer stores serial numbers and revision levels of the data acquisition/processing circuitry for configuration management purposes; and informational files are used to convey general information from the system to the attached computer.

5. The data acquisition and data processing system as defined by claim 1 further comprising a standard I/O file interface for use by the attached computer to transfer data with the system wherein the attached computer uses one or more files of data acquisition/data processing data to access and read or write data to/from said data acquisition and processing circuitry.

6. The data acquisition and data processing system as defined by claim 1 wherein the non-volatile memory for storing data records is one of a PROM, EPROM and Flash EPROM.

7. The data acquisition and data processing system as defined in claim 1 wherein the random access memory for storing data acquired by the system is one of a dynamic RAM and a static RAM.

8. The data acquisition and data processing system defined in claim 1 further comprising a narrow SCSI interface capable of accepting and executing SCSI-2 commands and capable of accepting and executing Ultra SCSI commands and data transfers like a disk drive.

9. The data acquisition and data processing system according to claim 1 wherein the disk interface circuitry is Ethernet.

10. The data acquisition and data processing system according to claim 1 wherein the disk interface circuitry is a Fiber Channel.

11. The data acquisition and data processing system according to claim 1 wherein the disk interface circuitry is IDE (integrated drive electronics) or EIDE (enhanced IDE).

12. A data mapping method for providing a set of data records suitable for transfer across a hardware interface so as to emulate the transfer of disk drive control information to an attached computer, said data mapping method comprising the steps of:

a) partitioning disk interface circuitry which emulates partitioning a disk drive;

b) formatting the disk interface circuitry, which emulates formatting a disk drive; and c) constructing a file system which emulates installing a file system on a disk drive.

13. A data mapping method for transferring a set of data records acquired by a data acquisition and data processing system across a hardware interface to an attached computer in the same manner as the file contents of a disk drive, the method comprising the steps of:

storing data acquired from the data acquisition and data processing system in locations with proper block, byte and word boundaries required for normal disk drive file data;

passing data using correct "endian order" or byte alignment (within a data word) corresponding to that required by the attached computer; and aligning blocks of data corresponding to certain channels of data acquisition to data blocks in the same manner as a file would be aligned on a disk drive.

14. A method for transferring indexed data across a hardware interface comprising the steps of:

receiving a request from an attached computer via disk interface circuitry;

determining whether the request is for indexed data which is out of range of stored data records;

returning an error signal via the disk interface circuitry for a request which is determined to be out of range;

indexing the stored data records and retrieving the control information based on the request; and forwarding the data corresponding to the request to the disk interface circuitry for transfer to the attached computer.

* * * * *